United States Patent
Ghosn et al.

(10) Patent No.: US 9,805,338 B1
(45) Date of Patent: Oct. 31, 2017

(54) DATABASE SYSTEM AND USER INTERFACES FOR MATCHING RELATED ENTITIES

(71) Applicant: SHOGUN ENTERPRISES INC., San Francisco, CA (US)

(72) Inventors: Anthony Ghosn, San Francisco, CA (US); Will Matthews, San Francisco, CA (US); Nikhil Pai, San Francisco, CA (US); Saurabh Sharan, San Francisco, CA (US)

(73) Assignee: Shogun Enterprises Inc., San Francisco, CA (US)

( * ) Notice: Subject to any disclaimer, the term of this patent is extended or adjusted under 35 U.S.C. 154(b) by 0 days.

(21) Appl. No.: 15/449,605

(22) Filed: Mar. 3, 2017

(51) Int. Cl.
  *G06Q 10/10* (2012.01)
  *G06F 17/30* (2006.01)
  *G06Q 10/06* (2012.01)
  *G06Q 40/00* (2012.01)
  *G06F 9/44* (2006.01)

(52) U.S. Cl.
  CPC ..... *G06Q 10/103* (2013.01); *G06F 17/30477* (2013.01); *G06Q 10/0635* (2013.01); *G06F 9/4443* (2013.01)

(58) Field of Classification Search
  CPC ...... G06Q 10/103; G06Q 40/02; G06Q 50/16; G06F 17/3047
  See application file for complete search history.

(56) References Cited

U.S. PATENT DOCUMENTS

| | | | |
|---|---|---|---|
| 7,548,883 B2 | 6/2009 | Lawrence | |
| 7,983,960 B2 | 7/2011 | Rigole | |
| 8,078,491 B1 | 12/2011 | Carragher et al. | |
| 8,463,697 B1 | 6/2013 | Narayan et al. | |
| 8,515,836 B1 | 8/2013 | Keld | |
| 8,666,885 B1 * | 3/2014 | Bramlage | G06Q 40/02 705/38 |
| 2002/0103669 A1 | 8/2002 | Sullivan, Sr. et al. | |

(Continued)

FOREIGN PATENT DOCUMENTS

WO   WO 2006/110121 A1   10/2006

OTHER PUBLICATIONS

"The Future Home Improvement Agency Handyperson Service Report", The National Body for Home Improvement Agencies, Feb. 2009, Department for Communities and Local Government. www.communities.gov.uk.*

(Continued)

*Primary Examiner* — Pan Choy
(74) *Attorney, Agent, or Firm* — Knobbe, Martens, Olson & Bear, LLP

(57) ABSTRACT

A database system is disclosed for matching related entities. The database system may gather, for example from one or more external data sources, various data items, and optionally calculate aggregate values related to the entities. The database system may further match related entities based on the aggregate values. Data may be gathered via one or more customized requests via specialized application programming interfaces (APIs). The database system may further advantageously receive responses via the specialized APIs, processes and standardize each response, aggregate the responses, and provide the responses for review via dynamic interactive graphical user interfaces.

14 Claims, 18 Drawing Sheets

(56) References Cited

U.S. PATENT DOCUMENTS

| | | | |
|---|---|---|---|
| 2004/0083157 A1* | 4/2004 | Sasser | G06Q 40/04 |
| | | | 705/37 |
| 2005/0234780 A1 | 10/2005 | Binder | |
| 2006/0271470 A1* | 11/2006 | McNamar | G06Q 40/00 |
| | | | 705/37 |
| 2007/0011021 A1 | 1/2007 | Worstell et al. | |
| 2009/0094043 A1 | 4/2009 | Leake et al. | |
| 2012/0011028 A1* | 1/2012 | Thomas | G06Q 30/0623 |
| | | | 705/26.61 |
| 2014/0289154 A1 | 9/2014 | Cooper et al. | |

OTHER PUBLICATIONS

"The Interface Between Retailers and Logistics Service Providers in the Online Market", Xing et al., European Journal of Marketing vol. 45 No. 3, 2011, pp. 334-357, Emerald Group Publishing Limited 0309-0566.*

* cited by examiner

500 ───▶

┌─────────────────────────────────────────────────────────────────┐
│ ╱─501                                                           │
│                                                                 │
│ First name: _____  Last name: _____  Telephone: _____  Email: _____ │
│                                                                 │
│ Type of project you wish to undertake: _____                   │
│                                                                 │
│ Location of the project site: _____                            │
│                                                                 │
│ When do you wish to start?  [ ] immediately  [ ] within 4 weeks  [ ] within 2 months  [ ] not sure │
│                                                                 │
│ What type of property do you wish to improve?  [ ] Single-Family Residential  [ ] Multi-Family Residential │
│                                                [ ] Commercial   │
│                                                                 │
│ How many bids do you wish to solicit from service providers?  [ ] 1  [ ] 2  [ ] 3  [ ] 4 │
│                                                                 │
│ What is your budget?  $ _____                                  │
│                                                                 │
│ Brief description of your project: _____                       │
│                                                                 │
│ Do you wish to request financing?  [ ] Yes  [ ] No              │
│                                                                 │
│ [[SUBMIT]]   [[CLEAR INPUT]]                                    │
│                                                                 │
└─────────────────────────────────────────────────────────────────┘

| Service Provider Portal | | VIEW PROFILE 🔔 👁 MY ACCOUNT |
|---|---|---|
| ⬅ Dashboard 30% | Credit | |
| $ Credit | | |
| 💬 Messages | Get transactions to kick off your next project! | |
| ✏ Edit Profile | The system is the perfect tool to help you transact new tools, supplies and much more. | |
| 🖼 Project Photos | | |
| ☆ Get Reviews | Get multiple responses from one application | |
| 🤝 Hire Subs | | |
| 🔧 Tools | Apply Transactions for The Following Job: "Plumbing repair" — 608 | FIRST NAME   LAST NAME — 604 |
| ⚙ Q&A | Job Description: Plumbing Repair for swimming pool filtration system | PHONE NUMBER   EMAIL |
| | Job Volume: 15,000$ | ADDRESS |
| [VIEW MY PROFILE] | Job site: 1234 Galactic Street, San Diego, CA 91290 | YEARLY INCOME |
| [UPGRADE ACCOUNT] | | SOCIAL SECURITY NUMBER |
| | | FICO SCORE |
| 👤 Your Account Manager | | LOAN AMOUNT |
| | | ( SUBMIT ) |

| Service Provider Portal | | | | VIEW PROFILE 🔔 👤 MY ACCOUNT ⊙ |
|---|---|---|---|---|
| ⬅ Dashboard 30% | Transactions Offers For | | | |
| $ Credit | The Following job: "Plumbing repair" Job Description: Plumbing Repair for swimming pool filtration system Job Volume: 15,000$ Job site: 1234 Galactic Street, san Diego, CA 91290 | ─704 | | |
| 💬 Messages | | | | |
| ✏ Edit Profile | | | Here are the best results just for you: | |
| 🖼 Project Photos | | | The system is the perfect tool to help you transact new tools, supplies and much more. | |
| ⭐ Get Reviews | | | | |
| 👥 Hire Subs | Jupiter Moon Bank $20,000 | 7.99% Interest Rate | $322.43 Monthly Payments | 72 Payments   8.99% APR   [ACCEPT] [SHARE] |
| 🔧 Tools | | | | |
| ⚙ Q&A | WarpLending $22,000 | 13.67% Interest Rate | $325.45 Monthly Payments | 45 Payments   14.34% APR   [ACCEPT] [SHARE] |
| [VIEW MY PROFILE] | MegaRocketloans $20,000 | 15.23% Interest Rate | $340.24 Monthly Payments | 72 Payments   16.2% APR   [ACCEPT] [SHARE] |
| [UPGRADE ACCOUNT] | FTL Speed Investments $30,000 | 15.2% Interest Rate | $203.39 Monthly Payments | 80 Payments   17.0% APR   [ACCEPT] [SHARE] |
| 🏠 Your Account Manager | | | | |

Service Provider Portal

| | ABOUT YOUR COMPANY | Insurance Information | | VIEW PROFILE 🔔 👤 MY ACCOUNT |
|---|---|---|---|---|

🏠 Dashboard (23%)
- BASIC Info
- Services
- Licenses $ Credit
- Location

💬 Messages
- Contact Info

✏️ Edit Profile
- User Settings —— 840
- Team

📷 Project Photos
- Insurance
- Badges

⭐ Get Reviews
- Marketing Materials

Hire Subs
- BUILDING PERMITS

Tools
- New Permit

⚙️ Q&A
- Manage Permits

[VIEW MY PROFILE]
[UPGRADE ACCOUNT]

Insurance Application:
Apply for insurance using System insurance Brokerage. Using their partners, they will find the best insurance rates just for you. — 844

Basic Info:
This information is based on your TransGalactic profile. Click here to edit Business Name: Contractors ABC   Legal Entity: LLC
Licence Number: #153235   Address: 555 Ivy Drive, San Francisco CA 94103, USA
Year Founded: 2015   Services: Remodeling, roofing, flooring Last 3 jobs:
123 8th St, San Francisco - Kitchen Remodel - $30,000
434 Davis St, San Francisco - Bathroom Remodel - $10,000
322 Maple Ave, San Francisco - Bathroom Remodel - $12,000

Financial Info:
This information is for insurance purposes only and will not be shared.

[$ANNUAL REVENUE] — 824    [$TOTAL RECEIPTS] — 828
[$EMPLOYEE PAYROLL] — 824   [$SUBCONTRACTOR PAYROLL] — 836

Insurance Types:
Select all the types of insurance you would like to apply for

[General Liability] [Workers Comp] [Business Owners Policy]
     808              812              816

(SUBMIT) — 850

Transaction Offers For The Following Job: — 848

"Plumbing repair"

Job Description: Plumbing Repair For swimming pool filtration system

Job Volume: 15,000$

Job Site: 1234 Galactic Street, San Diego, CA 91290

Tell us about you

Scan your drivers license or

First Name
Last Name
Birthday
Address
Zip code
State
City

NEXT — 1012

Congratulations!
You qualify for this great rates:

★★★
Mega Rocket Loans   $326.76 Monthly Payment   5.5% Interest Rate   72 Payments   6.2% APR ★★★
Jupiter Moon Bank   $253.23 Monthly Payment   6.4% Interest Rate   72 Payments   7.0% APR ★★★
FTL Speed Investments   $523.25 Monthly Payment   5.5% Interest Rate   48 Payments   8.0% APR 1044
1000

FIG.10C

Mega Rocket Loans $20,000 Principal
$3,526.56 Total Interest Paid
72 Payments
6.2% APR 14%
$326.76 Monthly Payment
5.5% Interest Rate ■ Fixed interest rate
▦ No prepayment Penalties
◉ No hidden fees

SHARE    ACCEPT — 1064

1000
1084

DATABASE SYSTEM AND USER INTERFACES FOR MATCHING RELATED ENTITIES

TECHNICAL FIELD

Embodiments of the present disclosure relate to data processing, including database and data item management, as well as a database system and database-related methods for dynamic and automated processing and access of particular data sources and electronic data items. Embodiments of present disclosure further relate to systems and techniques for accessing one or more databases in substantially real-time to generate and provide dynamic and interactive graphical user interfaces.

BACKGROUND

Electronic databases provide for storage and retrieval of electronic data items. Data items may be combined to calculate various aggregate values.

SUMMARY

The systems, methods, and devices described herein each have several aspects, no single one of which is solely responsible for its desirable attributes. Without limiting the scope of this disclosure, several non-limiting features will now be described briefly.

According to various embodiments, a database system is disclosed for matching related entities. The database system may gather, for example from one or more external data sources, various data items, and optionally calculate aggregate values related to the entities. The database system may further match related entities based on the aggregate values. Data may be gathered via one or more customized requests via specialized application programming interfaces (APIs). The database system may further advantageously receive responses via the specialized APIs, processes and standardize each response, aggregate the responses, and provide the responses for review via dynamic interactive graphical user interfaces.

In some implementations, the system may process hundreds of thousands (or more) of entities when performing related-entity discovery and/or calculating aggregate risks. Accordingly, in various embodiments, large amounts of data are automatically and dynamically processed in response to user inputs.

Various embodiments of the present disclosure provide improvements to various technologies and technological fields. For example, existing database systems may lack the ability to discover related entities, or to calculate aggregate quantities across sets of multiple entities. The present disclosure describes improvements to, and useful applications of, database systems. For example, the database system disclosed here, according to various embodiments, efficiently locates entities related to one or more given entities in a database comprising a large number of entities, and dynamically generates compound quantities, including probabilistic quantities, related to multiple entities. Additionally, various embodiments of the present disclosure are inextricably tied to computer technology. In particular, various systems and methods discussed herein provide monitoring of electronic databases, processing of large volumes of data items, generation and transmission of electronic notifications, and the like. Such features and others are intimately tied to, and enabled by, computer technology, and would not exist except for computer technology. Further, the implementation of the various embodiments of the present disclosure via computer technology enables many of the advantages described herein, including more efficient processing of various types of electronic data.

Accordingly, in various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The present disclosure describes various embodiments of interactive and dynamic user interfaces that are the result of significant development. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interface via the inputs described herein may provide an optimized display of, and interaction with, data (including data representing various entities, e.g. entities in a transaction) and may enable a user to more quickly and accurately access, navigate, assess, and digest the data than previous systems.

Further, the interactive and dynamic user interfaces described herein are enabled by innovations in efficient interactions between the user interfaces and underlying systems and components. For example, disclosed herein are improved methods of receiving user inputs (including methods of interacting with, and selecting, particular data items), translation and delivery of those inputs to various system components, automatic and dynamic execution of complex processes in response to the input delivery, automatic interaction among various components and processes of the system, and automatic and dynamic updating of the user interfaces (for example, to display related entities, or to display compound quantities). The interactions and presentation of data via the interactive user interfaces described herein may accordingly provide cognitive and ergonomic efficiencies and advantages over previous systems.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings.

FIG. 5A illustrates an example user interface of the system prompting for information related to a project, according to an embodiment of the present disclosure.

FIG. 5D illustrates an example user interface, presenting an offer to a user, according to an embodiment of the present disclosure.

FIG. 6 illustrates an example user interface, prompting for information related to a service providers' application, according to an embodiment of the present disclosure.

FIG. 7 illustrates an example user interface, in which various options are presented to a service provider, according to an embodiment of the present disclosure.

FIG. 8 illustrates an example user interface, in which an application is presented to a service provider, according to an embodiment of the present disclosure.

FIG. 9 illustrates an example user interface, in which various offers are presented to a service provider, according to an embodiment of the present disclosure.

FIGS. 10A, 10B, and 10C illustrate example user interfaces presented on a mobile device, according to an embodiment of the present disclosure.

DETAILED DESCRIPTION

Figure 1:
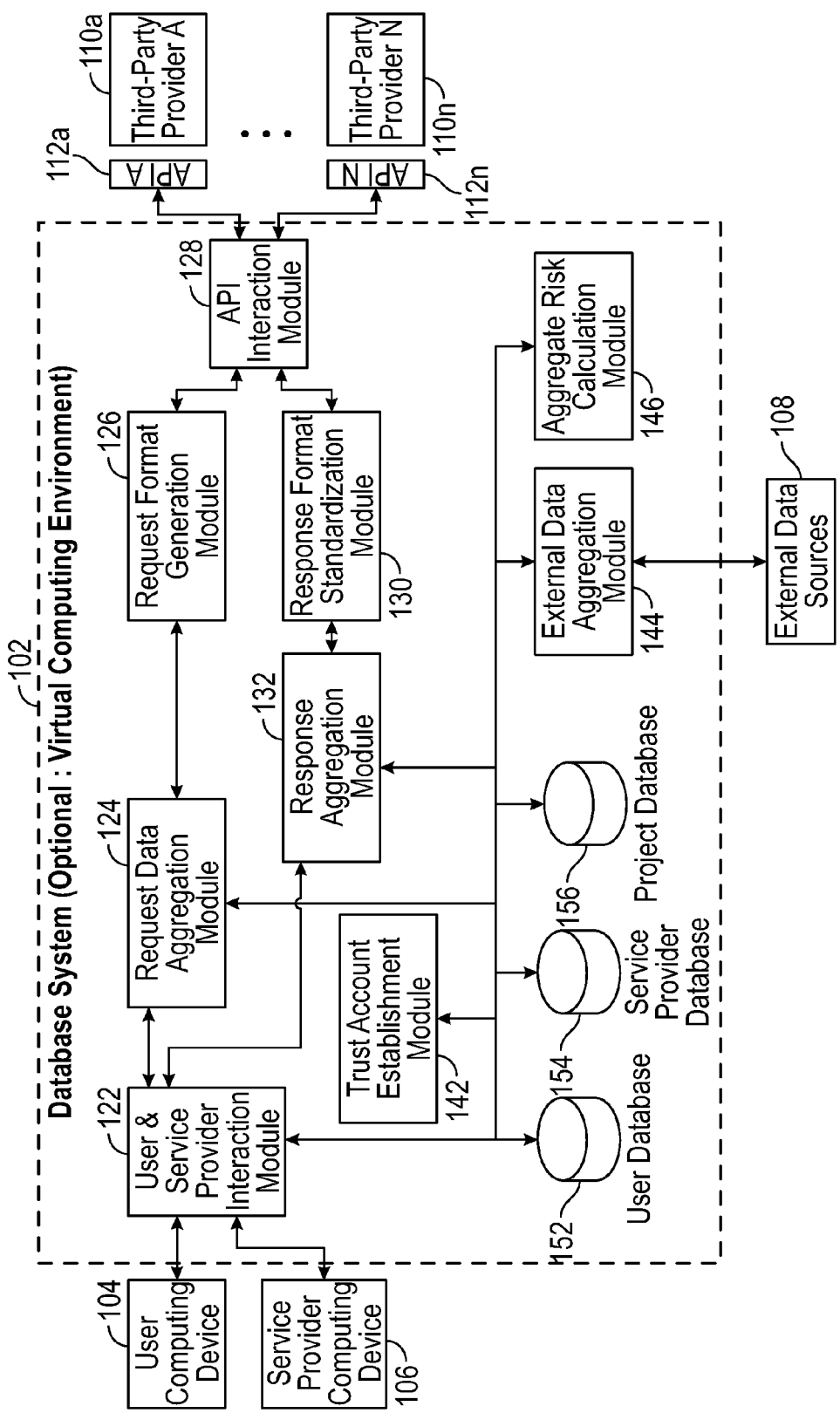
FIG. 1 is a block diagram showing various aspects of a database system and network environment in which the database system may be implemented, according to various embodiments of the present disclosure.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

I. Overview

Differences in electronic communication formats, and types of data communicated by different devices, may create difficulties in gathering and analyzing data for reducing risk. For example, risk associated with a given transaction, when viewed with limited data, may appear high. However, if significantly more data were to be analyzed, it may turn out that the risk is actually much lower. Gathering and analyzing the data to make such an accurate determination may be greatly hampered by differences in electronic communication formats and types of data communicated by different devices. Further, manual gathering and analysis of such data may not be possible due to the volumes of data, formats that are only electronically accessible, complex computation and machine learning models, etc.

The systems and method described herein may advantageously overcome one or more of these difficulties by, in part, efficiently and electronically generating data requests in multiple formats according to specific application programming interface request (API) templates, making electronic API requests, receiving responses electronically, and converting the response into a standardized, common format. The requested and/or received information may be automatically analyzed to make a more advances assessment of risk. Such assessments may be used to match related entities, for example, in connection of specific transactions.

As mentioned above, according to various embodiments a database system is disclosed for matching related entities. The database system may gather, for example from one or more external data sources, various data items, and optionally calculate aggregate values related to the entities. The database system may further match related entities based on the aggregate values. Data may be gathered via one or more customized requests via specialized APIs. The database system may further advantageously receive responses via the specialized APIs, processes and standardize each response, aggregate the responses, and provide the responses for review via dynamic interactive graphical user interfaces.

Additionally, the database system may perform related-entity discovery and calculating aggregate risk. The database system may advantageously gather, for example from one or more external data sources, various information related to an entity and a project of the entity, optionally calculate a risk related to that entity and that project, generate one or more custom formatted requests related to that entity and that project, and provide those customized requests to one or more third-party providers via specialized application programming interfaces (APIs). The database system may further advantageously receive responses from the one or more third-party providers via the specialized APIs, processes and standardize each response, aggregate the responses, and provide the responses to the entity for review. The database system may advantageously store and process relationships among entities and/or projects, and further calculate aggregate risks associated with particular transactions based on risk contributions from individual entities associated with the particular transactions. The system may enable various types of transactions with various entities including various third-party providers via dynamic interactive graphical user interfaces.

a. Example Implementations and Use Cases

Various fields may benefit from databases and a database system that may perform, amongst other improvements, related-entity discovery and calculation of aggregate quantities or risks. For example, in the area of financing and insurance related to home improvement contracting, idiosyncratic risk profiles of both consumers and contractors, specific consumer preferences preventing the use of standardized transactions, and a large number of small market participants may make application of traditional computer-implemented database and pricing models difficult. This may lead to market participants having to resort to manual and less efficient ways of finding counterparties and estimating risk, and thus incurring high transaction costs. There thus remains a need for novel computer-implemented pricing and risk estimation models that perform well in the context of low-volume, individualized transactions and parties with idiosyncratic risk profiles.

Data related to the various entities in the transaction may be acquired from various sources. For example, internet-based listing services, classifieds, and auction houses have enjoyed significant popularity with consumers and professionals. These services may reduce the transaction costs of parties wishing to enter into a transaction by allowing the parties to find each other. When a transaction is facilitated through such a service, for example, when an item is sold through an online auction house or a consumer browses online classifieds looking for a contractor in a specific area, the service provider may learn different information about the parties to the transaction. For example, an online listing service that repeatedly connects a certain contractor with customers may acquire information about the contractor's specialization, geographic area, etc. This information may potentially be useful for the purposes of estimating risk related to the specific transaction, for example for calculating insurance premiums to insure against such risks, or to provide financing to one or more parties to the transactions. Novel processing methods are thus needed to extract this information, combine it with other measures of risk and accurately quantify the different risks related to the transaction.

Advantageously, such risk management may be facilitated using computer-implemented databases. According to various embodiments, information related to a transaction between two or more parties is facilitated by gathering, analyzing, and storing information related to the one or more parties, and/or information related to the transaction, in a database. This information may be provided by the parties to the transaction, or may be retrieved from third parties. The information may then be combined according to a model of risk estimation taking into consideration information related to the parties, as well as information to the transaction.

Embodiments of the present disclosure may provide online listing, classifieds, or other transaction middleman, brokerage, or facilitation services, and associate the data learned in the context of providing these services with the transactions and their parties. This data may then be combined with other data and utilized to estimate various risks inherent in the transaction, which may then advantageously be used to calculate financing or insurance quotes to insure against one or more of such risks.

b. Example Implementations of the System Related to Risk Management

Projects (e.g., commercial or residential projects) may expose the different parties involved in the project to a diverse variety of risks. For example, a project may require an up-front investment, such as for materials, labor, or equipment, before the project may be undertaken. For example, a service provider hired by a principal to perform a project (e.g. home improvement) may need to supply materials, as well as the labor, in order to undertake the project. This necessity to invest capital, the return on which is uncertain and is in the future, creates risks for the various participants in the transaction. For example, the principal may be exposed to the risk of the service provider abandoning the job, failing to satisfactorily complete the job, or failing to complete the job in a timely manner. Conversely, the principal may be exposed to the risk of the principal defaulting on his or her financial obligations. Because the principal and/or the service provider may wish to offload these financial risks, they may turn to intermediaries or third-party providers, such as banks or insurance companies, to assume some or all of the risks associated with the project. For example, the principal may purchase non-completion insurance from a third party, under which he or she may recover from the insurance provider in the event that the service provider fails to complete the job so that the principal may, for example, retain another service provider to complete the work. Conversely, the service provider may turn to an intermediary or third-party provider to insure against the principal's risk of default, for example, by entering into an invoice factoring agreement with a factoring provider or purchasing a payment bond from a bank.

For some projects, the required up-front investment may be so high that the service provider requires external financing in order to be able to undertake the job. For example, a home improvement company may need to invest significant amounts of money into a home improvement project, but may only be able to recover the cost and make a profit after the project is successfully completed. In this situation, the service provider may turn to a third-party provider, such as a bank, to provide funding, allowing it to commence the job and bridge the time between the investment and the eventual recovery from the customer. Such a financing transaction exposes the third-party provider to various risks, some of which are associated with the service provider generally, others specifically associated with the project. For example, if the service provider is not able to satisfactorily complete the job, or if the customer defaults, the service provider may lose its investment and may thus not be able to repay the third-party provider.

Even if the service provider seeks to mitigate its risk by only committing resources to the job once it has confirmed that the customer has secured adequate financing, it may not be guaranteed that the amount will actually be paid; for example, the principal may, after the job has been commenced, pay other third-party providers or fund consumption expenses. The third-party provider may thus be able to provide more competitive service rates if its risk estimates take into consideration not only the identity of the service provider, but also information about the underlying project or transaction. According to some embodiments of the present disclosure, various risk estimates of a transaction are determined by aggregating information including information about a participant in a transaction, about other transactions that this participant has entered into, and about parties to those other transactions to determine an aggregate risk estimate.

Various computer-based systems exist that seek to determine the probability of an entity, such as an individual or a corporation, defaulting under an obligation related to a commercial transaction. For individuals, some such models are implemented by consumer credit reporting bureaus, determining a consumer credit score for an individual. For entities, such as professional corporations, similar models exist to determine a business credit report. Because these models generally provide an estimate of the default risk of the individual or entity, rather than the default risk related to any specific transaction or obligation, it may be advantageous to augment them with additional information related to specific transactions or obligations if a more accurate estimate of default risk related to that specific transaction or obligation is desired. This may be particularly advantageous in situations where the entity in question is a small entity, such as a service provider operating as a sole proprietorship, for which calculations based on business credit scoring models may not exist, and personal credit report of the owner may not adequately take into considerations the risk to which the entity is exposed in a commercial context. In an embodiment, a system according to the present disclosure augments information received from credit reporting bureaus, so as to reflect risks associated with the party defaulting a specific transaction or obligation.

In various embodiments, the system may utilize a statistical model, such as a Bayesian model, to determine the risk estimate. For example, the system may determine that in a transaction involving parties A and B, party A has a certain risk of defaulting under an obligation. The risk of party B defaulting may then be modelled using the Bayesian formula as the sum of the risk of party A defaulting multiplied by the risk of party B defaulting given party A's default, and the risk of party B's default multiplied by the probability of party A not defaulting. Advantageously, this may allow to refine the estimate of party B's default if the probability of party A's default is known.

Entities may seek to enter into a transaction without necessarily trusting each other's willingness and/or ability to perform. To facilitate such transactions, it may be advantageous to utilize a third party that is trusted by the transaction participants as an intermediary to increase the chances of faithful performance of the transaction. For example, in the context of a transaction between a principal and a service provider, a trust account may be established with a third-party provider. The third-party provider may manage the trust account with respect to the transaction to provide better guarantees to all transaction participants (e.g., that the service provider performs the services and the principal provides payment for the services). As described herein, the system may employ one or more trust accounts to reduce risk, or as a factor in assessing risk, to participants to a transaction. Advantageously, this may allow the service provider to accept a project with reduced risk of the principal's default, and thus reduce the overall transaction costs of the parties.

c. Use of External APIs

Various third-party providers operate electronic application or underwriting systems. In some instances, these systems may allow access through Application Programming Interfaces (APIs). Typically, each API requires its own set of information about a prospective borrower, such as the amount of a requested transaction (e.g. a loan), the borrower's contact information, and the repayment period. Advantageously, embodiments of the present disclosure may collect information related to a prospective borrower, form API requests in the format and containing the information required by the API of each third-party provider ("third-party provider format"), collect responses from the API of each third-party provider, translate the different results back into a uniform format that facilitates comparison, storage and/or processing ("common format"), and show the results to the user (e.g., prospective borrower). For example, different third-party providers may require different types of information, and in different format; for example, third-party provider A may require an applicant's monthly income, year of birth, and a credit score, whereas third-party provider B may require an applicant's annual income, month, day and year of birth, and no credit score. The system may also provide the third-party provider with its own calculation of risk, for example by providing a calculated "risk score" to the third-party provider, provide the third-party provider with various "raw" data items that the third-party provider may then use to perform its own calculation of risk, and/or both.

Advantageously, rather than presenting the user with different applications to provide the requested information repeatedly in different formats, the system may retrieve the required information from its database and automatically convert it into the format expected by the third-party provider. Advantageously, the system may then also convert the individual responses received from each API, which may again be in a third-party provider-specific format, into a common format that may facilitate comparison by the user, such as, for example, by converting offers quoted in different compounding periods into a representation with one common compounding period. Similarly, various embodiments may use external APIs to access other services of, receive quotes from, provide instructions to, or make contracts with, financial intermediaries, such as escrow providers or insurance providers.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

II. Terms

In order to facilitate an understanding of the systems and methods discussed herein, a number of terms are defined below. The terms defined below, as well as other terms used herein, should be construed broadly to include the provided definitions, the ordinary and customary meaning of the terms, and/or any other implied meaning for the respective terms. Thus, the definitions below do not limit the meaning of these terms, but only provide exemplary definitions.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. Additionally, although the present disclosure may show or describe data as being stored in combined or separate databases, in various embodiments such data may combined and/or separated in any appropriate way into one or more databases, one or more tables of one or more databases, etc.

Entity: Includes users, service providers, and/or others that interact with the database system, as described herein. An entity may include a person, a group of people, a legal entity (e.g., a company, business, partnership, corporation, and/or the like), and/or the like. Information related to various entities may be stored by the database system as electronic data items in various databases of the database system. Additionally, information related to various entities may be analyzed by the database system to accomplish the various functionality described herein. Communication with entities may be accomplished, for example, via interactive user interfaces, application programming interface (API) requests, and/or the like.

User: Any entity that may interact with the database system for the purpose of being connected with a service provider and/or receiving a service from a service provider. Typically, a user interacts with the database system regarding a project that they are interested in accomplishing. The term "principal" is also used herein to refer to users. Users may include, for example, real estate owners or managers looking for service providers, for example, to make improvements on real property.

Service Provider: Any entity that may interact with the database system for the purpose of being connected with a user and/or providing a service to a user. Typically, a service provider interacts with the database system regarding interest in preforming all or part of a project of a user. Service providers may include, for example, contractors.

Third-Party Provider: Any entity that may facilitate all or part of a transaction between a user and a service provider. Examples of third-party providers include lenders, insurers, surety bond providers, payment bond providers, and/or the like.

III. Example Computing Devices, Databases, and Systems

FIG. 1 is a block diagram showing various aspects of a database system 102 and network environment in which the database system may be implemented, according to various embodiments of the present disclosure. As shown in FIG. 1, the database system 102 includes various modules and databases, and it communicates with various external devices and systems. Specifically, according to an embodiment the database system 102 includes a user and service provider interaction module 122, a request data aggregation module 124, a request format generation module 126, an API interaction module 128, a response format standardization module 130, a response aggregation module 132, a trust account establishment module 142, an external data aggregation module 144, an aggregate risk calculation module 146, a user database 152, a service provide database 154, and a project database 156. The database system 102, according to an embodiment, may communicate with various external devices and systems, including a user computing device 104, a service provider computing device 106, one or more external data sources 108, and one or more APIs 112a-n that are associated with respective third-party providers 110a-n.

As described below, the various modules of the database system 102 may comprise computer readable program instructions that may, in some embodiments, be logically divided as shown in FIG. 1 (for purposes of clarify and illustration), or may, in other embodiments, be combined or organized differently. Further, in some implementations aspects of the modules of the database system 102 may be organized differently or performed in parallel. For example, aggregation and analysis of responses (an aspect described in reference to response aggregation module 132 below) may be performed in parallel with, or before, standardization of responses (an aspect described in reference to response format standardization module 132 below).

In various embodiments, the various external devices and systems may communicate with the database system 102 via any suitable communications medium or protocol. For example, the various external devices and systems may communicate with the database system 102, and/or with one another, via any combination of local and remote network, the Internet, wired or wirelessly, and/or the like. Further, in various embodiments aspects of any of the modules and/or databases of the database system 102, and/or the various external devices and systems, may be organized differently from what is shown in the example illustration of FIG. 1. For example, in some implementations the database system 102 may be comprised of multiple separate computing systems or devices and may communicate with one another to accomplish the functionality described herein.

User and service provider interaction module 122 provides an interface, such as a graphical user interface (GUI) to user computing devices, such as user computing device 104, and service provider computer devices, such as service provider computing device 106. Interaction module 122 may be configured to store data received from user computing device 104 in a user database 152, and to store data received from a service provider computing device 106 in a service provider database 154. For example, a user may provide, through user computing device 104, various items of personal information about him or herself, such as a location, an address, contact information, and other types of information. Similarly, a service provider may, through service provider computing device 106, provide various information related to a service provider, such as what type of services the service provider is willing to provide, what area the service provider is offering services in, and contact information for the service provider. Interaction module 122 may also receive, from both user computing device 104 and/or service provider computing device 106, information about various projects contemplated or started by a user or a service provider. For example, a user may, through user computing device 104, indicate that he or she is willing to enter into a transaction related to a project in a certain geographical area, and may be looking for service providers to become a counterparty to such a transaction. Similarly, a service provider, through service provider computing device 106, may indicate that the service provider is willing to enter into certain types of transactions related to a given project, and that he or she is looking for users to become counterparties to such a transaction.

Interaction module 122 may also receive an indication from user computing device 104 that a user is willing to enter into a transaction related to a project with one or more third-party providers, such as third-party provider A 110a to third-party provider N 110n. Similarly, interaction module 122 may receive an indication from service provider computing device 106 that a service provider would be willing to enter into such a transaction with a third-party provider.

Interaction module 122 may be configured to generate user interface data useable for rendering the various interactive user interfaces described herein, so as to enable receipt and providing of information to, for example, users and service providers. The user interface data may be used by the system, and/or another computer system, device, and/or software program (for example, a browser program), to render the interactive user interfaces. The interactive user interfaces may be displayed on, for example, electronic displays (including, for example, touch-enabled displays) of, for example, user computing device 104 and service provide computing device 106.

Advantageously, because interaction module 122 and request data aggregation module 124 have access to user database 152, service provider database 154, and project database 156 (among other aspects and modules of the database system 102), interaction module 122 and request data aggregation module 124 may have a comprehensive view of a project, and various transactions associated with the project, as well as information about participants in these transactions. As such, interaction module 122 and/or request data aggregation module 124 may receive and package the relevant information from these databases into a request. Request data aggregation module 124 may, additionally, combine or enhance the data stored within database system 102 with external data through external data aggregation module 144. External data aggregation module 144 may access one or more external data sources 108 to request and receive additional data related to a user, a service provider, a transaction, or other entity associated with the project. Examples of external data sources 108 may include service provider licensing data sources, public records (e.g., real estate transactions, addresses and phone numbers, etc.) data sources, credit-related data sources, and/or the like. The external data aggregation module 144 may communicate with the external data sources 108 via any suitable method, including, for example, via API requests, screen scraping, electronic messages, and/or the like.

The information stored in database system 102 may be combined with the external data from data aggregation module 144 in aggregate risk calculation module 146. Advantageously, aggregate risk calculation module 146 may utilize information related to a user, a service provider, a project, and other information (e.g., any information obtained by the external data aggregation module 144 from the external data sources 108) to create a combined estimate of risk. This risk may include contributions of risk from a user, from a service provider, from a project, and other risk factors. Request data aggregation module 124 may then package, or aggregate, the various items of information, including information related to a user from user database 152, information related to a service provider from service provider database 154, information related to a project from project database 156, external data obtained from external data aggregation module 144, and a risk estimate from aggregate risk calculation module 146.

The aggregated data may then be passed to the request format generation module 126. The request format generation module 126 may format, or convert, the data into one or more formats suitable for transmission to third-party providers. For example, third-party provider A 110a may require information transmitted to it to be in a particular binary format, and only comprise certain pieces of information or fields. Third-party provider N 110n may, conversely, require that information transmitted to it be in a hypertext format and contain certain different fields. Request format generation module 126 may accommodate these different structures and formats for each third-party provider by referring to format templates stored by the system and associated with each third-party provider. API interaction module 128 then receives the information, appropriately formatted for each third-party provider, from request format generation module 126, and transmits it to the various third-party providers through their respective APIs. For example, API interaction module 128 may transmit the request as formatted for third-party provider A 110a through API A, to third-party provider A 110a. API interaction module 128 may iterate through all potential third-party providers, eventually reaching third-party provider N 110n and accessing that third-party provider through API N 112n. In some implementations, the user and/or service provider may specify particular third-party providers of interest, and to which the system may transmit the information. In various embodiments, different third-party providers may be more appropriate than others for particular requests, and the system may determine (e.g., based on a type of project, a size of project, a calculated risk, etc.) particular third-party providers to provide the information to.

API interaction module 128 additionally receives responses from the various third-party providers through their respective APIs. API interaction module 128 then forwards the received responses to response format standardization module 130, where the various third-party provider structures and formats are converted into a common format (as described further below). Response aggregation module 132 gathers the standardized responses from the various third-party providers and stores them in the various databases, including user database 152, service provider database 154, and/or project database 156, as appropriate. Additionally, response aggregation module 132 may determine particular responses that are to be passed to the interaction module 122 for display in a user interface. For example, as described below, the system may identify the most useful, or best, or a prioritized list of, responses to display to a user. The system may also, by the response aggregation module 132, determine that, for example, a threshold number of responses have not been received, and/or a quality of the responses does not meet a threshold. In such an instance, the system may determine not to present responses to the user.

Database system 102 may further comprise a trust account establishment module 142, facilitating creation and disbursements from a trust account (e.g. an account held by a third-party in the name of a principal and from which disbursements to a service provider may be made as the service provider becomes entitled to payments).

As indicated in FIG. 1, in an implementation the database system 102 (or one or more aspects of the database system 102) may comprise, or be implemented in, a "virtual computing environment". As used herein, the term "virtual computing environment" should be construed broadly to include, for example, computer readable program instructions executed by one or more processors (e.g., as described below in the example of FIG. 11) to implement one or more aspects of the modules and/or functionality described herein. Further, in this implementation, one or more modules (e.g., user and service provider interaction module 122, request data aggregation module 124, request format generation module 126, API interaction module 128, response format standardization module 130, response aggregation module 132, trust account establishment module 142, external data aggregation module 144, and/or aggregate risk calculation module 146) of the database system 102 may be understood as comprising one or more rules engines of the virtual computing environment that, in response to inputs received by the virtual computing environment, execute rules and/or other program instructions to modify operation of the virtual computing environment. For example, a request received from the user computing device 104 may be understood as modifying operation of the virtual computing environment to cause the request data aggregation module 124 to gather data associated with the request, the request format generation module 126 to generate third-party provider requests with the appropriate formats and information, and the API interaction module 128 to transmit those requests to one or more APIs. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by the request data aggregation module 124 and/or responses received and analyzed by the response aggregation module 132. Initial operation of the virtual computing environment may be understood as an establishment of the virtual computing environment. In some implementations the virtual computing environment may comprise one or more virtual machines or other emulations of a computing system. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the database system 102 as a virtual computing environment may advantageously enable executing different aspects or modules of the system on different computing devices or processors, which may increase the scalability of the system. Implementing one or more aspects of the database system 102 as a virtual computing environment may further advantageously enable sandboxing various aspects, data, or modules of the system from one another, which may increase security of the system by preventing, e.g., malicious intrusion into the system from spreading. Implementing one or more aspects of the database system 102 as a virtual computing environment may further advantageously enable parallel execution of various aspects or modules of the system, which may increase the scalability of the system. Implementing one or more aspects of the database system 102 as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

IV. Example Database Structures

Figure 2A:
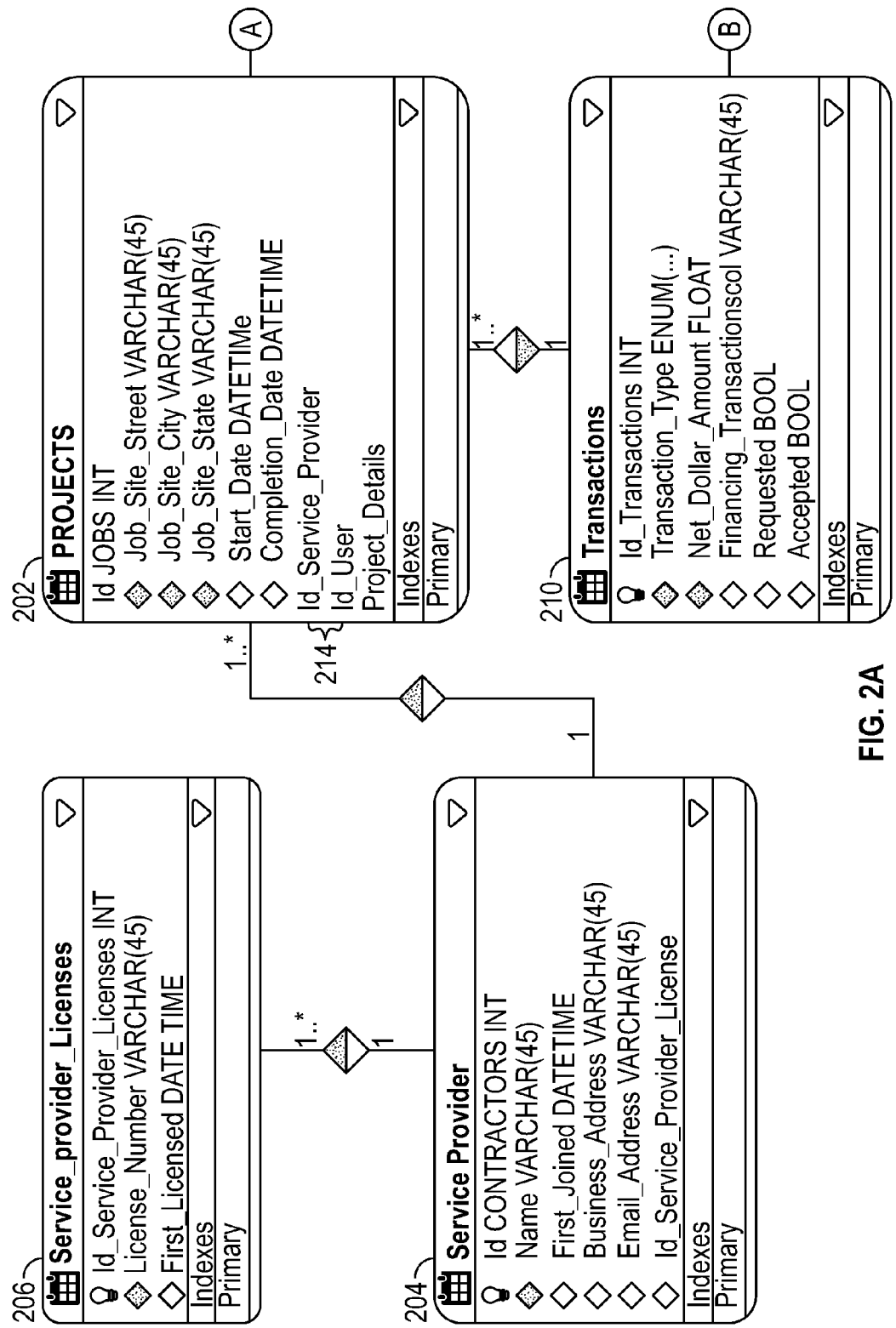
FIG. 2A is a schematic illustration of example database structures of the database system, according to various embodiments of the present disclosure.
Figure 2A:
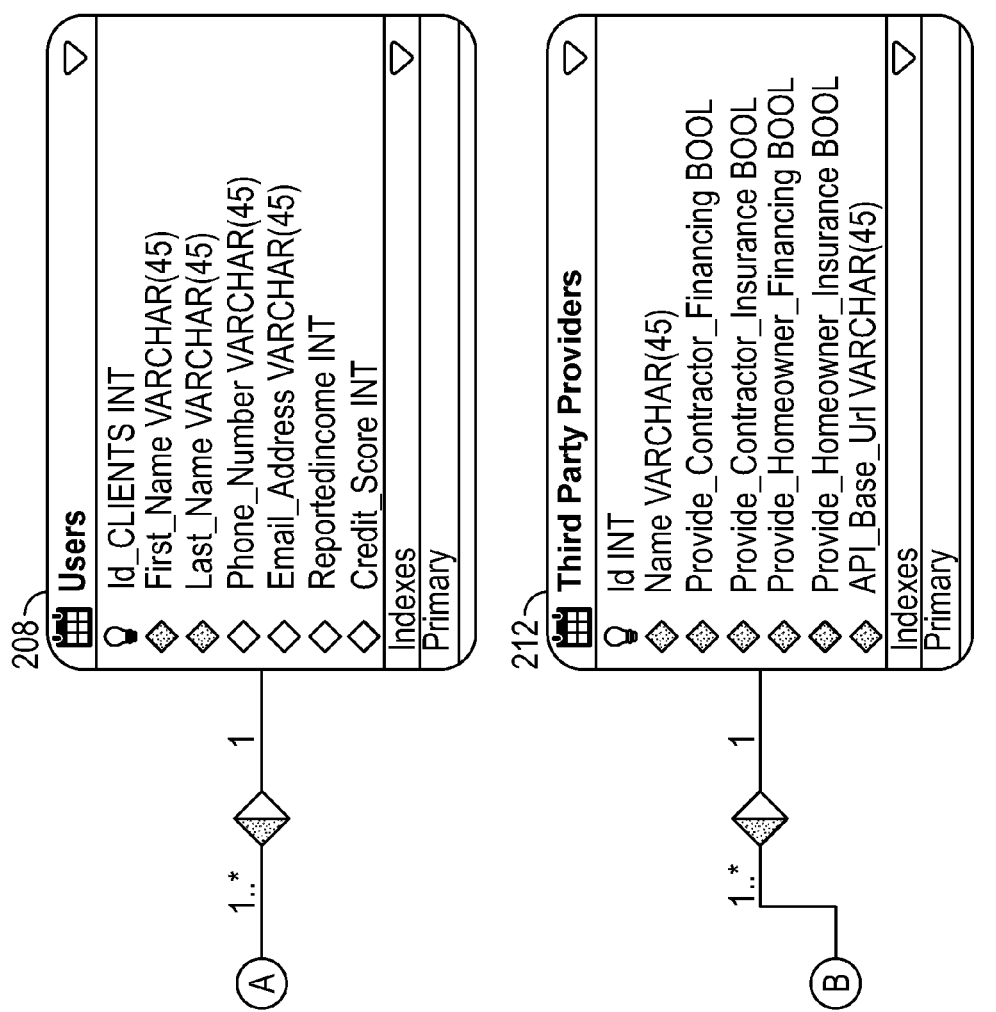

FIG. 2A is a schematic illustration of example database structures of the database system, according to various embodiments of the present disclosure. FIG. 2A illustrates database tables 202, 204, 206, 208, 210, and 212 that, in various embodiments, may be stored in the same database, separate databases, or any combination two or more databases. For example, FIG. 2A illustrates a users table 208, a service providers table 204, and a projects table 202 that may be stored in the respective databases 152, 154, and 156 described above in reference to FIG. 1. However, such need not be the case and, indeed, in some embodiments tables 208, 204, and 202 may be stored in a single database or any combination of two or more databases (just as databases 152, 154, and 156 may be organized differently, as described above). Additionally, the information and attributes shown in FIG. 2A are provided as an example, and in other embodiments additional or less information or attributes may be stored by the system.

In the example of FIG. 2A, the various tables show how logical relationships among user, service providers, and projects may be stored and maintained by the database system. The service providers table 204 comprises various data items or attributes related to service providers such as name, business address, email address, and license information. License information regarding service providers is stored by reference to service provider licenses table 206. Users table 208 comprises various data items or attributes related to users such as name, phone number, email address, reported income, credit score, etc.

Projects table 202 comprises various data items or attributes related to projects such as the location of the project, dates associated with the project, and project details. Additionally, as indicated at 214, projects table 202 may store a reference to a user associated with the project, and a reference to a service provider associated with the project. In some embodiments, projects table 202 stores references to one or more transactions associated with the projects and/or one or more third-party providers associated with the projects.

The transactions table 210 comprises various data items or attributes related transactions such as type of transaction, status of transaction (e.g., requested, accepted, etc.), dollar amount of transaction, etc. In some embodiments, transactions table 210 stores references to one or more third-party providers associated with a transaction (e.g., of whom requests have been made or received, who are involved in the transactions, etc.). Data related to third-party providers are stored in third-party providers table 212, which comprises various data items or attributes related to third-party providers such as name, type, how to query the Application Programming Interface (API) of the provider, etc.

The example tables of FIG. 2A may be relationally linked, for example by the use of foreign keys. For example, the projects database 202 may store a reference to a particular service provider from service providers table 204 and a particular user from users table 208. Transactions table 210 may store a list of transactions, referencing both the associated third-party provider from third-party providers table 212 and the associated project from projects table 202, for example through foreign keys. Transactions of the transactions table 212 may each be identified by a unique identifier (e.g., "Id_Transactions"). Similarly, other data items of the other tables described above may be similarly identified according to unique identifiers. Advantageously, this may allow the databases to be queried so as to provide contextual information related to projects, users, and service providers. Additionally, this use of relational databases may allow the database system to efficiently determine existing transactions already associated with a project.

V. Example Data Format Generation and Standardization

Figure 2B:
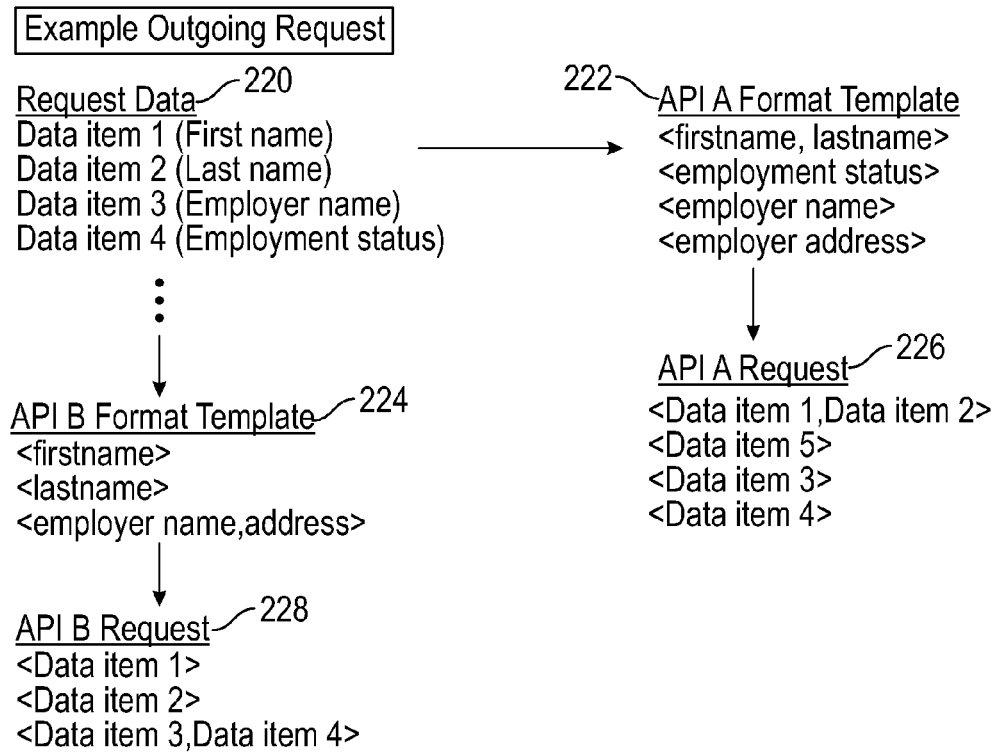
FIG. 2B is an illustration of example API request data generation, according to various embodiments of the present disclosure.

FIG. 2B is an illustration of example API request data generation, according to various embodiments of the present disclosure. As described above and below, in some implementations the request format generation module 126 may receive data associated with requests to be sent to various third-party providers. FIG. 2B illustrates an example of such request data 220. For example, request data may include any data gathered by the request data aggregation module 124, such as first name, last name, employer name, employment status, etc. The request format generation module 126 may access API templates associated with the third-party provider to which requests are to be sent. Examples of such templates include API A format template 222, and API B format template 224. As shown in the example, the format templates may differ with respect to the organization of data, the type of data, specific data items, format of the data, and/or in any other respect. The system may determine such templates automatically by requesting such information from the third-party providers, and/or the system may be provided the template information from other sources. The system, e.g., via the request format generation module 126, may then convert the request data 220 into formatted API requests (e.g., API A request 226 and API B request 228) based on the format templates. The requests may then be sent to the third-party providers, e.g., via the API interaction module 128.

Figure 2C:
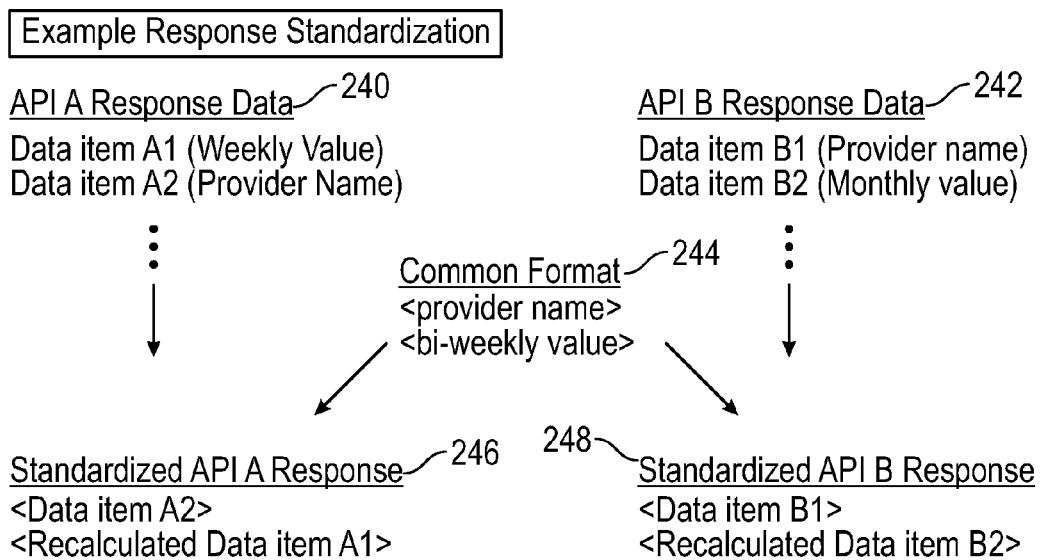
FIG. 2C is an illustration of example data standardization, according to various embodiments of the present disclosure.

FIG. 2C is an illustration of example data standardization, according to various embodiments of the present disclosure. As described above and below, in some implementations the response format standardization module 130 may receive data associated with responses from various third-party providers. FIG. 2C illustrates example of such response data (e.g., API A response data 240 and API B response data 242). As shown, the response data from different third-party providers may differ with respect to the organization of data, the type of data, specific data items, format of the data, and/or in any other respect. For example, API A response data 240 includes "weekly value" as a first data item, while API B response data 242 includes "monthly value" as a second data item (e.g., the analogous data items from the two providers are provided in a different arrangement, and based on different time frames). The system, e.g., via the response format standardization module 130, may access a common format 244 to which every response is to be converted or standardized. An example common format 244 is shown in FIG. 2C, wherein the data is to include a provider name first, and a bi-weekly value second. The system, e.g., via the response format standardization module 130, may, based on the common format, generate standardized API responses (e.g., standardized API A response 246 and standardized API response 248) for each of the received API responses. Such generation may include, for example, recalculation of values (e.g., converting to a common time frame, such as bi-weekly, from differing time frames). The standardized responses may then, e.g., be provided to response aggregation module 132.

With reference to FIGS. 2B and 2C, the data items, templates, formats, responses, requests, etc. are provided for illustrative purposes, and in various embodiments the system may implement any number of variations on the examples shown. In various embodiments, outgoing requests and/or incoming responses may be communicated in any suitable formats. For example, XML, JSON, and/or any other suitable formats may be used for API requests and responses. In some implementations, the system may advantageously, as described above, convert data from one format to another (e.g., based on templates) to enable communications with multiple third-party providers and API. Such implementations may be particularly advantageous as the system is enabled to scale and communicate via ever more disparate API's over time, and be easily adapted to changes in existing API's as needed.

Additionally, in some implementations communications with one or more API's may be encrypted and/or authenticated. For example, public and/or private key exchanges may take place to establish authenticated and/or encrypted communications between, e.g., the system and computing systems of third-party providers, to, e.g., protect user data from exposure to potentially malicious actors.

VI. Example Methods

Figure 3A:
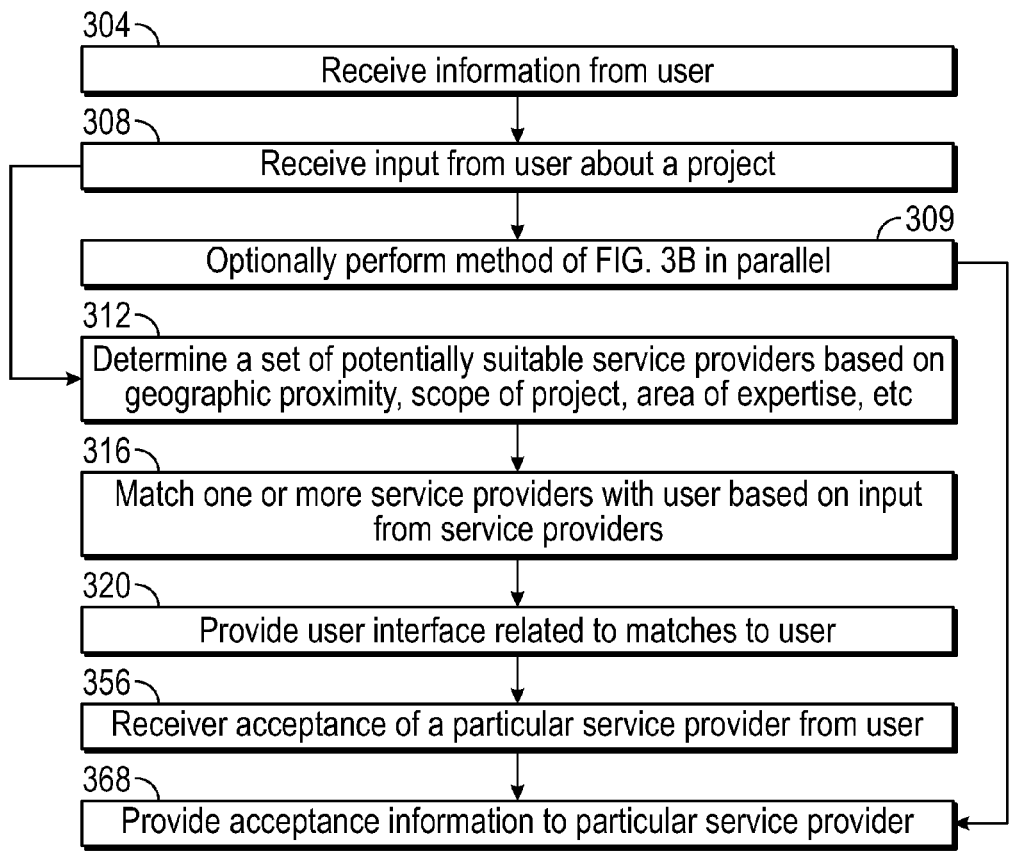
FIG. 3A is a flowchart illustrating an example method of the database system, according to an embodiment of the present disclosure.

FIG. 3A is a flowchart illustrating a schematic sequence of blocks related to facilitation of a transaction related to a project, according to, and facilitated by, an embodiment of the present disclosure. In some implementations, one or more of the blocks of FIG. 3A may be optional, and/or blocks may be rearranged.

At block 304, the system receives information (e.g., personal information) from a user. For example, the system may receive a name, contact information, telephone number, email address, residence address, and other information from a user. This information may be queried and received from the user through an online interface, as may be provided by the interaction module 122 as discussed with respect to FIG. 1.

At block 308, the system receives information about a particular project that the user considers to undertake. For example, the system may receive information about the location of a job site, an approximate budget, a timeframe for completion, a type and scope of work to be performed, and other related information. This information may again be queried and received from the user through an online interface, as may be provided by the interaction module 122 as discussed with respect to FIG. 1.

At block 312, the system utilizes the information received at blocks 304 and 308 to query its database of service providers in order to determine a set of potentially suitable service providers for the project. For example, the system may search its database for suitable service providers based on geographic proximity to the location of the job site, adequate size to meet the needs of the scope of the project, or adequate expertise and licensing in the area that the user wishes to undertake the project. In an implementation, the system may utilize a distance metric between a given entity (e.g. the user) and a set of other entities in the database (e.g. the potential service providers), and discover entities that are related to the given entity ("related-entity discovery") by having a low distance metric. The distance metric may use scoring to convert into a numerical value, and thus make comparable various factors, including the geographical distance between the potential service provider and the user or the job site, the potential service provider's ratings from other users, and other factors. These processing blocks may be performed by combining data from user database 152, service provider database 154, and/or project database 156 as discussed with reference to FIG. 1.

At block 316, the system then proceeds to solicit bids from one or more service providers in the field of potentially suitable service providers that was determined at block 312. For example, the system may send electronic messages to the contractors that were determined to be suitable for the job, indicating that they were determined to be potentially suitable for a new job and soliciting bids on the project. The contractors may then be directed, for example by the use of a link embedded in the electronic message, to log into a contractor user interface wherein they can review additional details about the user's project and, if interested in undertaking the project, submit bids. Solicitation of the bids from the service providers may be performed through a user interface provided to service providers by interaction module 122, as discussed with reference to FIG. 1.

At block 320, one or more of the submitted bids collected at block 316 are presented to the user. In an embodiment, this may be implemented by a user interface ranking the bids according to certain criteria, for example, the bids may be displayed in a table format, ranked from the cheapest to the most expensive bid. The user may be permitted to review additional details (for example, regarding the service provider's licensing status, the service provider's insurance status, or the service provider's history) by selecting the bid, whereupon the user is redirected to a new page in the user interface presenting additional detail about the selected bid and the corresponding service provider. Presentation of the bids may be performed through a user interface provided to users by interaction module 122, as discussed with reference to FIG. 1.

At block 368, the accepted bid is submitted to the winning service provider. For example, the system may send an email notification to the service provider selected by the user, indicating that the bid has been accepted by the user, and providing additional information, for example contact information, related to the user or information related to the project. Advantageously, the contractor may also be notified that it may request additional transactions, such as, for example, financing related to the project (e.g. to purchase tools, materials, or to rent equipment), that may be needed to start the project before payments from the user are received, for example.

The service provider may then, in some implementations, be offered to apply for various transactions with third-party providers, such as, for example, financing and insurance. If the contractor indicates interest in such transactions, the system may proceed to the method described below in reference to FIG. 3C. The method of FIG. 3C may optionally be performed in parallel with the method of FIG. 3B.

As indicated at block 309, in some implementations the method described below in reference to FIG. 3B may optionally be performed in parallel with certain blocks of FIG. 3A. Alternatively, the method described below in reference to FIG. 3B may optionally be performed after the method of FIG. 3A.

Figure 3B:
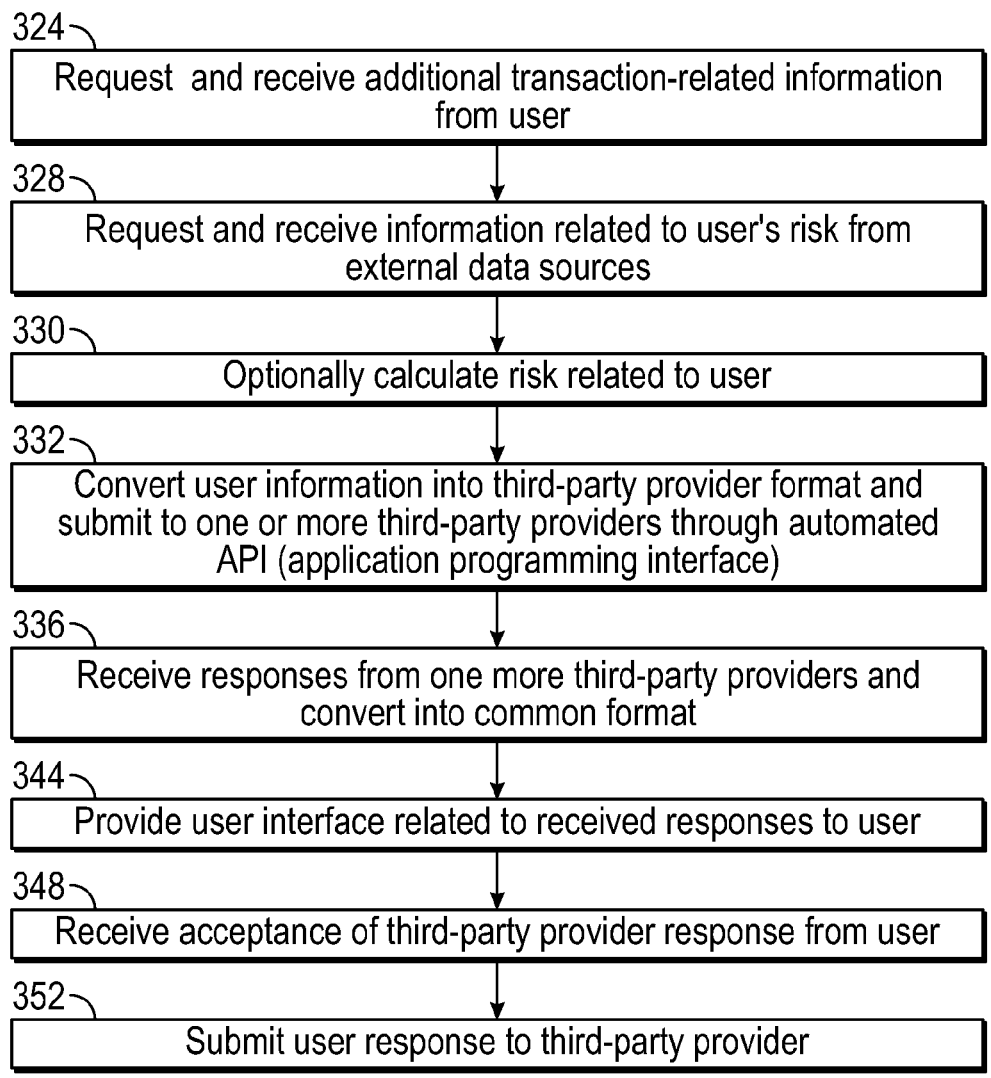
FIG. 3B is a flowchart illustrating another example method of the database system, according to an embodiment of the present disclosure.

FIG. 3B is a flowchart illustrating a facilitation of a transaction related to selection of a third-party provider for a project, according to, and facilitated by, an embodiment of the present disclosure. In some implementations, one or more of the blocks of FIG. 3B may be optional, and/or blocks may be rearranged.

At block 324, additional transaction-related information related to the user is solicited through a user interface. For example, the system may request the user to self-report various items of information that may be relevant to third-party providers, for example his or her credit score, his or her income, his or her net worth, his or her social security number, and other information related to his or her creditworthiness where the user is applying for a loan. Advantageously, in the case of a user applying for a loan from a third party, allowing the user to self-report his or her credit score at this block allows the system to calculate tentative financing rates for the user without having to request the user's credit score. This may not only allow for faster processing of the user's request because no external data queries, such as a credit lookup, is necessary at this point, but may also encourage the user to proceed with the transaction because no credit inquiry is performed and thus no adverse impact on the user's credit score will happen at this point. Solicitation of additional information may be performed through a user interface provided to users by interaction module 122, as discussed with reference to FIG. 1.

Advantageously, the information obtained in block 324 may be aggregated and combined to allow calculation of a score or tier. For example, representative or complementary values related to a user's creditworthiness may be used as lookup indices in a matrix or array to determine a score or tier. This score or tier may then be submitted to a prospective third-party provider in lieu of some or all of its constituent values. For example, a two-dimensional array may be used providing for a mapping of a user's credit score and annual income, respectively, to a numeric score or tier value. The values of the array may be created based on an empirical or theoretical model of, for example, correlation between the constituent factors and a user's default risk. Because a user's score or tier may not have a unique mapping back to the user's credit score and annual income, this avoids unduly divulging information to the lender and protects the privacy of the user, as well as the information advantage of the system.

At block 328, additional information related to the user's credit risk may be requested from third parties. Any information received is aggregated with the existing information stored in the system's databases. For example, the system may query public databases as to whether user has any outstanding judgments or liens. In an embodiment, the system may, at this point, also request the user's credit score from one or more credit reporting agencies. Requesting, receiving and aggregating the information may be performed by the request data aggregation module 124 and/or the external data aggregation module 144, as discussed with reference to FIG. 1.

At block 330, the system may optionally calculate a risk related to the user and/or the project associated with the request. For example, the system may combine the information associated with the user, the project, and/or the service provider in assessing risk associated with the user. For example, certain characteristics or attributes of the user (e.g., credit score, employment history, geographic location, etc.), certain characteristics or attributes of the project (e.g., size of the project, estimated cost of the project, location of the project, etc.), and/or certain characteristics or attributes of the service provider (e.g., history of completing projects, experience, expertise, license, etc.) may be assessed and weighted by the system to determine a risk associated with the user and/or the project. The risk assessment may be provided with the requests as noted below. Alternatively, the system may provide the raw information that may be used to assess the risk with the requests. Risk calculation may be performed by aggregate risk calculation module 146, as discussed with reference to FIG. 1.

At block 332, one or more third-party providers are solicited to make offers to enter into a transaction with the user. The offers are solicited by accessing an application programming interface of the one or more third-party providers and submitting, to each third-party provider, information related to the user, the transaction, the project, and/or the risk. Advantageously, the system may select or package the appropriate information required for each third-party provider's application programming interface, format the request in a format expected by the respective third-party provider, and submit the a request. Packaging and formatting the information may be performed by the request format generation module 126, while submission may be performed through API interaction module 128, as discussed with reference to FIGS. 1 and 2B-2C.

At block 336, the system receives various responses, such as transaction offers or rejections, from the one or more third-party providers through the APIs and converts them from various formats specific to the third-party providers into a common format. These results may be indicative of a risk associated with the user or transaction, and may immediately be stored in the user database or another database, so that they are available for future calculations of risk associated with the user. Advantageously, this may allow the system to take advantage of the risk estimation models of various third-party providers, in addition to its own risk estimation model, and thus combine its own risk estimates with the risk estimates of third parties (who may, for example, have access to information that the system does not have access to) and thus enhance the accuracy of its own risk estimate. Receiving the information may be performed by an API interaction module 128, and conversion into a standard format may be performed by response format standardization module 120, as discussed with respect to FIG. 1.

At block 344, the transaction offers received from the one or more third-party providers are presented to the user in a user interface. For example, various transaction offers may be presented in a tabular format, ranked, for example, by a measure of cost of the transaction, such as, in the case of a loan, an effective interest rate. Advantageously, the system may perform various calculations and visualizations to make it easier for the user to compare the different offered transactions, even though they may have been received in different formats. For example, in the case of a loan, the various loan offers may be quoted with respect to different compounding periods, may have different interest rates, and different nominal amounts. Some of the offers may feature an amortized discount, while others may not. This may make it difficult for the user, who may not have the mathematical means and financial background knowledge to compare the different offers, to determine the most favorable offer. Advantageously, because the system is provided with the information related to all offers, it may, for example, calculate effective interest rates based, for example, on an annual percentage rate, thus making offers based on different interest rates, different compounding periods, and different amortized discounts easily comparable. The system may also rank the different offers based on, for example, effective interest rate, thus making it even easier for the user to pick the most favorable offer. Presentation and visualization of the transaction offers may be performed by the interaction module 122 exposing a user interface to a user computing device 104, as discussed with respect to FIG. 1. To disambiguate multiple requests from users, each offer may be associated with an offer ID, which may be a unique identifier that is generated (e.g. randomly or incrementally) when an offer is received or generated. Advantageously, this allows each offer to be uniquely referenced, e.g. in user interfaces and email communication, by embedding the unique identifier in links or email messages related to the offer. For example, when a link to accept an offer is clicked, the offer ID may be transmitted, thus allowing the system to immediately reference the offer as to which the acceptance is directed. Advantageously, each unique identifier may be associated with a timestamp of when the offer was generated or sent to the user. Advantageously, this allows the system to enforce an expiration for offers; for example, the system may only accept offers that were sent in the last 5 min, 10 min, 30 min or 120 min, thus allowing the user a reasonable time to accept offer while denying the user the opportunity to gain a windfall by storing and arbitraging offers. In some implementations, the offer ID may be associated with, or be the same as, the Transactions ID of the transactions table 210. For example, in some implementations the offer may be stored in the transactions table 210, while in other implementations only accepted offers/transactions may be stored in the transactions table 210 (and another table may store unaccepted offer data).

In some implementations, the system may determine particular responses that are to be provided to the user (e.g., passed to the interaction module 122 for display in a user interface) or not provided to the user based on one or more criteria. For example, the system may identify the most useful, or best, or a prioritized list of, responses to display to a user. The system may also, by the response aggregation module 132, determine that, for example, a threshold number of responses have not been received, and/or a quality of the responses does not meet a threshold (e.g., rates associated with the responses are some threshold amount higher than, e.g., an average for similar requests). In such an instance, the system may determine not to present responses to the user. For example, in an implementation, the system may determine that at least three responses are needed before any responses are presented to a user. In an implementation, the system may determine that responses (or a threshold number of responses) have not been received within a threshold amount of time (e.g., a number of second or minutes). In this case, the system may resend requests, sent new requests to different third-party providers, or determine that responses are not to be presented to a user. Similar determinations may be made with respect to the responses associated with blocks 320, 364, and/or 390 described above and below.

At block 348, an acceptance of an offer is received from the user. For example, the user may select the desired offer in a user interface via user computing device 104 as discussed with respect to FIG. 1, and thus confirm the terms and conditions of the proposed transaction online.

At block 352, the system again utilizes the application programming interface of the third-party provider whose transaction offer the user has accepted to inform the third-party provider that its offer has been successful. This may again be performed through API interaction module 128, as discussed with reference to FIG. 1.

Figure 3C:
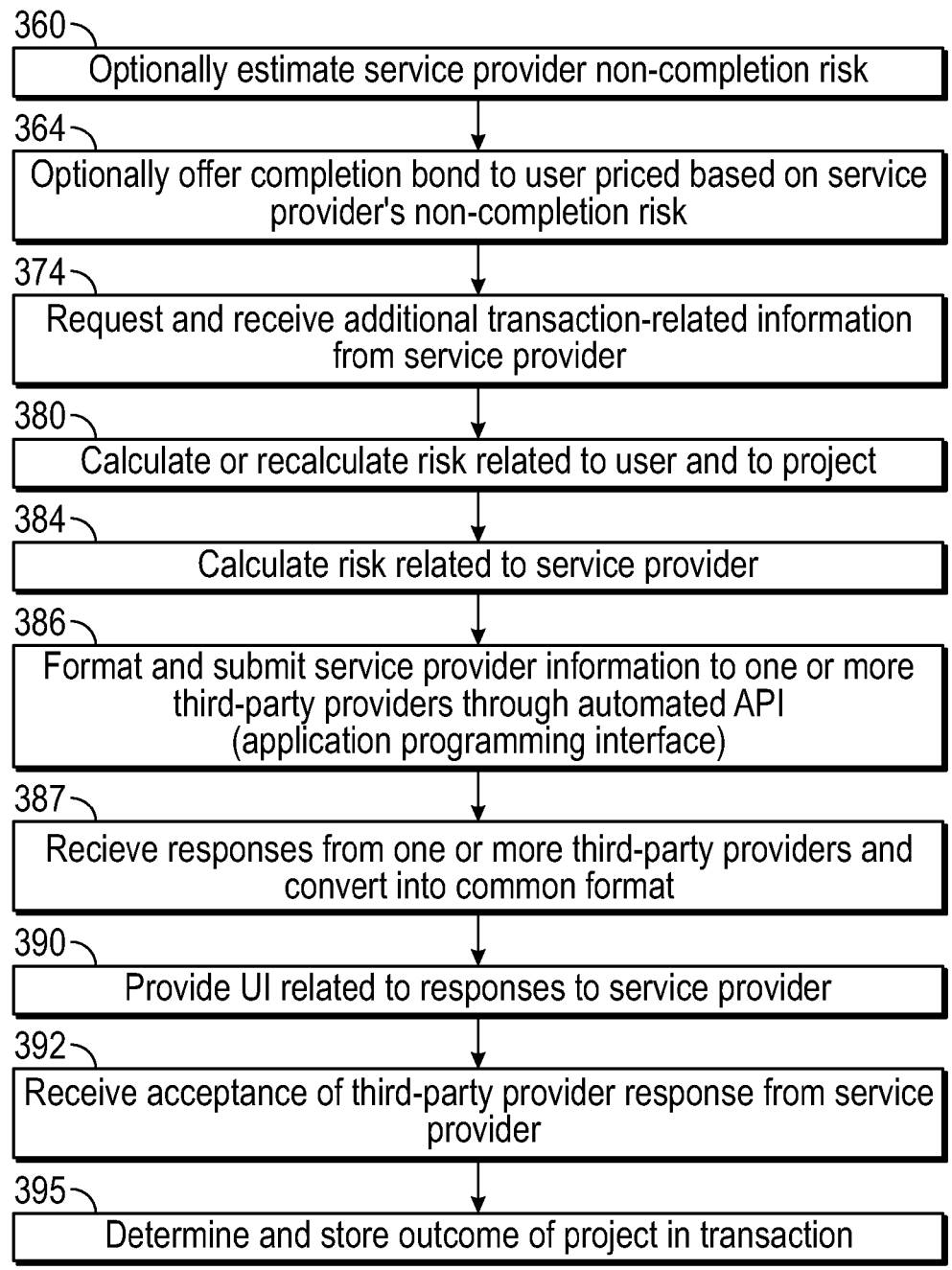
FIG. 3C is a flowchart illustrating yet another example method of the database system, according to an embodiment of the present disclosure.

FIG. 3C is a flowchart illustrating a schematic sequence of blocks related to service provider selection and transaction facilitation for a project, according to, and facilitated by, an embodiment of the present disclosure. In some implementations, one or more of the blocks of FIG. 3C may be optional, and/or blocks may be rearranged. In an implementation, the method of FIG. 3C may be performed after the method of FIG. 3B.

At optional block 360, the system proceeds to estimate a selected service provider's risk of not completing a project in order to determine the expected cost of selling insurance against that risk. This modeling and calculation may be performed by aggregate risk calculation module 146, as discussed with reference to FIG. 1. Advantageously, because of the information already provided by the user, the service provider, and various third parties, the risk estimation in this block may be able to accurate predict a variety of risks that may lead to the contractor not completing the job. For example, the system may take into consideration prior engagements of the service provider facilitated through the system, the length of the relationship with the service provider, the experience of the service provider in the type of work that the user has requested to be performed, the scope of the project, information about the service provider's licensing status and any professional complaints filed against the contractor with a licensing authority, and other information. The system may take into consideration both information that is specific to the service provider or generally to service providers in, for example, the service provider's field of work or geographic area, but the system may also take into consideration elements of risk that are specific to the particular job that the user has requested. Advantageously, this may allow the system to more accurately predict the risk of non-completion for the particular job than a system that only relies on general metrics related to the contractor without taking into consideration the specific job.

At optional block 364, the user may be offered to purchase a completion bond to insure the user against the risk of the service provider's non-completion. Advantageously, the cost of the completion bond may be calculated based on the estimate of the service provider's non-completion risk as calculated at block 360. For example, the system may price the non-completion bond based on an estimate the average payout under the non-completion bond contract.

At block 374, the system may request additional information from the service provider related to potential transactions with third-party providers. For example, if the service provider indicates seeking to enter into a financing transaction with a third-party provider, the system may request information related to the amount of financing that the service provider seeks, the period of repayment, any collateral offer by the contractor, or any personal guarantees by third parties. Based on this additional information, and other information that is already available to the system, the system then generates an estimate of the risk of the third-party provider on a loan.

At block 380, the risk of the user defaulting under his or her payment obligations under the project is first estimated or re-estimated if it had previously been estimated (e.g., as described above in reference to FIG. 3B). Advantageously, this may allow the system to take into consideration the fact that many instances of service provider default under a transaction related to a project are triggered by a default of another participant in the project, such as the user. For example, the service provider may end up in a situation where labor, materials, and other resources have been spent on a project on which the project customer then defaulted. This may make the service provider in turn more likely to default on another transaction related to that project, such as a loan.

The risk of the user defaulting may be determined based on various factors including, for example, the scope of the project, other factors or parameters of transactions related to the user, such as the interest rate of a financing provided to the user by a third-party provider, if any, an amount of equity the user has in the job site (such as his or her residence), the user's credit score, and other information. The system may thus, for example, reflect the observation that, all other factors being equal, a user may be more likely to default on a transaction which are more onerous to him or her, such as a larger loan, or a loan with a higher interest rate.

Advantageously, not only information related generally to the user, but also information to the specific project, or individual transactions arising under the project, may be used to determine the risk of the user defaulting on payments related to the specific job. For example, a user may be substantially more likely to default on payments related to a project for a job site, such as a residence, in which he or she holds little or no equity than to default on a project for a job site in which he or she holds substantial equity, as a user with higher equity may stand to lose more from foreclosure based on a foreclosure action by a service provider (e.g. under a contractor's lien) if his or her equity is higher. This may allow the system to predict the risk of the user defaulting on the specific job more accurately than if only information related to the user generally, but not related to the specific project or job site would be considered. The aggregation and integration of information to calculate a risk estimate across multiple entities related to a transaction or project as described may be performed by the aggregate risk calculation module 146 combining information from various databases and/or data source, including user database 152, service provider database 154, project database 156, and/or external data sources 108.

At block 384, the risk of the third-party provider defaulting on obligations under a loan provided to it is estimated. Advantageously, the system may consider the estimate of the user's risk of defaulting as determined at block 380, thus reflecting the fact that a service provider's default under a transaction related to a project may be caused by or be correlated with a user's default under another transaction related to the project. Advantageously, the system may also consider information related to the contractor, and other information, so as to account for risks arising independently of the user's risk of default. For example, even if the user meets all his financial obligations on time, the service provider may go bankrupt, fail to complete the job adequately, and thus never become entitled to payments, or may simply abandon the job and embezzle the money received from the third-party provider. To account for these and other risks unrelated to any default of the user, the system may take into consideration information known to the system, including information related to different projects and information obtained from a third party. For example, the system may consider the service provider's credit report, the personal credit reports of individuals associated with the service provider, such as proprietors and general partners, the duration of the relationship with the service provider, the scope of the project, the amount of financing the service provider has requested, and the risk of the type of work that the service provider is performing.

It will be appreciated the some of these items of information may not be accessible to the public, or a third-party provider, such as a lender, because they represent details of relationships between a user and a service provider that may not always be revealed to parties unrelated to the transaction or project. For example, it may be difficult to locate trustworthy information indicating how many jobs a specific service provider has already successfully completed, even though this may be an important consideration in determining the risks associated with a future job performed by this service provider. Advantageously, the system may thus also utilize historic data from past transactions from the same service provider or other service providers in the same geographic area or line of work, to determine the risk of the service provider's default. For example, the system may empirically determine a certain default rate for service providers in the field of demolition, and another default rate for service providers in the field of bathroom remodeling.

Additionally, the system may advantageously take into account, in the calculation of risk related to the service provider, user, and/or project, the existence of a trust account related to the project. For example, in an implementation the system may facilitate establishment, e.g., via trust account establishment module, of a trust account that may hold in escrow funds related to the project. Alternatively, the system may communicate with a third-party provider for establishment of a trust account, and/or to determine the existence of a trust account. In an implementation, the system may recalculate a risk in response to the establishment or existence of a trust account. Thus, advantageously, the system may incorporate knowledge of the trust account in calculating risks. The existence of such a trust account associated with a project may significantly reduce risks to the third-party provider (and/or the user and service provider), enabling better transactions terms.

Advantageously, according to certain embodiments of the present disclosure, the various risk calculations described above (e.g., in reference to blocks 330, 360, 380, and 384) may take into account multiple factors that may not be available outside of the system. These factors may include a more comprehensive or holistic view of a transaction or project, including multiple characteristics or attributes of the user, service provider, and/or project; historical information associated with the user, service provider, and/or project; the existence of trust accounts (which may or may not be managed or established by the system); and/or any other information as described herein. In any of the risk calculations described herein, the various items of information may be combined and/or aggregated, weighted, normalized, etc., as appropriate. In some implementations the system may use statistical models, such as a Bayesian model, to determine risk estimates. For example, the system may determine that in a transaction involving parties A and B, party A has a certain risk of defaulting under an obligation. The risk of party B defaulting may then be modelled using the Bayesian formula as the sum of the risk of party A defaulting multiplied by the risk of party B defaulting given party A's default, and the risk of party B's default multiplied by the probability of party A not defaulting. Advantageously, this may allow to refine the estimate of party B's default if the probability of party A's default is known. In some implementations the system use one or more machine learning or artificial intelligence algorithms, incorporating feedback from previous transactions and historical data, to provide risk assessments with increasing accuracy over time. In some implementations the system may use combinations of methods described above, and/or other suitable methods, of calculating risk based on the various items of information gathered by the system.

At block 386, the information from the service provider, in addition to any related information, is converted to a format specific to each individual third-party provider, and submitted to one or more third-party providers through their APIs (as described above). Similar to block 340 that was previously discussed, this allows different third-party providers to submit provide response to the service provider.

At block 387, various transaction offers, such as offers for financing, insurance, and other transactions, are received through the APIs interfacing with potential third-party providers and are converted into a common format. Advantageously, the different financing options may be converted to, and displayed, in a common format that allows for simple comparison, despite the offers being quoted in different formats. For example, offers having their interest rate quoted based on different compounding periods may be normalized to an APR (annual percentage rate) to allow for a simple numeric comparison.

At block 390, the service provider is then presented with a user interface (UI), indicating the different financing offers. The service provider may be prompted through the user interface to select one of the offers. This may be performed through the interaction module 122 presenting a user interface to service provider computing device 106.

At block 392, an acceptance of one of the offers is received through the user interface. This may be performed through interaction module 122 receiving a selection in a user interface to service provider computing device 106.

Having successfully facilitated the transaction between a user, a service provider, and, where applicable, one or more third-party providers, the system then waits at block 395 until the outcome of the job can be determined. It then receives feedback from various parties involved related to the outcome of a project, and stores the determined outcome in its transaction database, thus further refining its risk modeling to facilitate more accurate risk estimates for future transactions. For example, the user may be contacted through an electronic message after the scheduled job completion date has passed, requesting information about the outcome of the project and how satisfied the user is with the outcome. Similarly, the service provider may be contacted through an electronic message after the completion date of the project has passed, requesting information about the outcome of the project and specifically, whether the user has met all obligations related to the project (e.g. payment).

In some embodiments, as noted above, alerts and/or notifications are automatically transmitted to a device operated by the user and/or service provider associated with a request or response (e.g., to notify the user and/or service provider of a response to a request, or a change in a response from a service provider). The alert and/or notification can be transmitted at the time that the alert and/or notification is generated or at some determined time after generation of the alert and/or notification. When received by the device, the alert and/or notification can cause the device to display the alert and/or notification via the activation of an application on the device (e.g., a browser, a mobile application, etc.). For example, receipt of the alert and/or notification may automatically activate an application on the device, such as a messaging application (e.g., SMS or MMS messaging application), a standalone application (e.g., an application for providing response user interfaces to users and/or service providers), or a browser, for example, and display information included in the alert and/or notification. If the device is offline when the alert and/or notification is transmitted, the application may be automatically activated when the device is online such that the alert and/or notification is displayed. As another example, receipt of the alert and/or notification may cause a browser to open and be redirected to a login page generated by the system so that the user can log in to the system and view the alert and/or notification. Alternatively, the alert and/or notification may include a URL of a webpage (or other online information) associated with the alert and/or notification, such that when the device (e.g., a mobile device) receives the alert, a browser (or other application) is automatically activated and the URL included in the alert and/or notification is accessed via the Internet.

Figure 4:
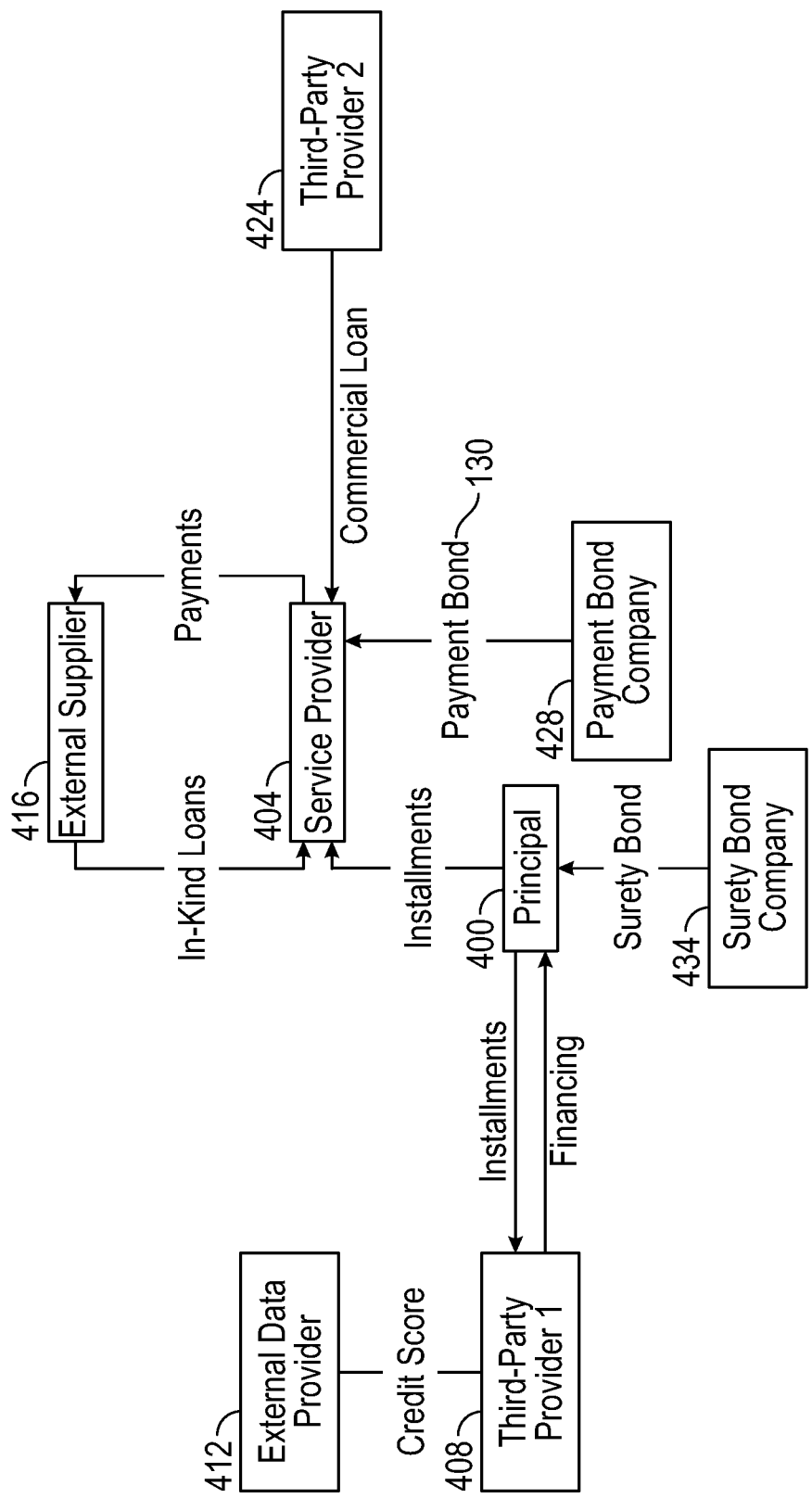
FIG. 4 is a schematic illustration of an example flow of information, according to an embodiment of the present disclosure.

FIG. 4 is a schematic illustration of an example flow of information related to a project, according to a transaction model that may not be characterized by calculation of risk across multiple entities and related-entity discovery, according to an embodiment of the present disclosure.

A principal/user 400 may seek to procure services from a service provider 404. Additionally, principal 400 may wish to enter into a transaction (e.g. financing or insurance), from a third-party provider 408 (e.g. a bank). The third-party provider 408 determines the rates and conditions upon which to grant enter into a transaction (e.g. a loan) to principal 400 based on its estimate of the risk of principal 400 defaulting under the transaction. Third-party provider 408 may, for example, turn to an external data provider 412 to request information about principal 400 (e.g. a credit score) to estimate principal 400's default risk. To provide the requested services and thus fulfill the agreed-upon terms, service provider 404 may need to procure various services, materials, or equipment from external suppliers. For example, service provider 404 may need to contract with an external supplier 416 for the provision of materials to be used on the project. Depending on the nature of the relationship between principal 400 and service provider 404, service provider 404 may need to pay third parties, such as external supplier 416 or, before any payments are received from principal 400. If home improvement contractor 404 does not have access to adequate internal sources of liquidity, such as, for example, income from other jobs, service provider 404 may need to resort to external financing to ensure sufficient liquidity to complete the project for principal 400. Home improvement contractor 404 may turn to various sources for external financing, such as third-party provider 2 424 (e.g. a commercial lender) to provide the liquidity needed until completing the job for principal 400. Service provider 404 may also turn to external supplier 416 as a source of external financing, for example by external supplier 416 providing in-kind loans. The amount charged for access to such credit may depend on, for example, service provider 404's default risk.

Service provider 404 may default in various situations; for example, service provider 404 may not, or not satisfactorily, complete the job for principal 400 and thus not become entitled to the full amount of payments from principal 400. Even if service provider 404 adequately completes the job, principal 400 may still default. In these situations, home improvement contractor 404 may not be able to fulfill its own obligations, such as obligations to external supplier 416 and/or third-party provider 2 424. To protect against the risk of principal 400's default, service provider 404 may contract with a third party, such as payment bond company 428, to assume the risk of principal 400's default by agreeing to post a payment bond 430, so that service provider 404 will be paid by payment bond company 428 in the event that principal 400 defaults. The cost of payment bond 430 to service provider 404 may be determined by the average risk of principal 400's default. Principal 400, conversely, assumes the risk of service provider 404 defaulting by failing to complete, or to satisfactorily complete, the job. For example, service provider 404 may abandon the job, which may require principal 400 needing to invest additional money to pay another contractor to finish the job. To protect against the risk of service provider 404's default, principal 400 may contract with a third party, such as surety bond company 434, to assume the risk of home improvement contractor 404's default by surety bond 438. Surety bond company 434 may not have detailed knowledge of the project principal 400 desires to undertake and the identity of service provider 404. As such, the cost of the surety bond 438 to principal 400 may be determined based on the average rate of default of home improvement contractors in the area of principal 400, for example. This may be considered an application of the actuarial method.

It will be appreciated that based on the illustrated structure of the transactions between the parties, various parties may only have information related to certain parts of the transaction but not others. This may lead to a less efficient market and thus higher transaction costs for various parties involved. For example, third-party provider 424 may not necessarily be aware which job the loan it is providing to service provider 404 will be used for; even if it were, it may not have access to information related to the default risk of principal 400 and thus may not be able to appropriately factor in default risk of principal 400 into the rate it charges service provider 404. External supplier 416 may be in a similar situation, not knowing the default risk of principal 400 for whose job its materials would be used and thus not being able to appropriately adjust the interest rate on its loans based on the default risk of principal 400. Third-party provider 424 and external supplier 416 may instead rely on estimates of the risk of service provider 404, as determined, for example, by a commercial credit report of contractor 404, or a personal credit report of one or more individuals associated with contractor 404. Conversely, surety bond company 434 may not have detailed information about home improvement contractor 404. It will be appreciated that the various parties in the transaction may be able to more accurately estimate risk, and thus compete better on price, if they would combine the information about principal 400, contractor 404 and the project to arrive at a combined risk estimate that more accurately reflects the different types of risk inherent in the transaction.

Advantageously, various aspects of the present disclosure may overcome one or more of these difficulties by automatically generating data requests in appropriate formats to API requests, gathering and analyzing data received, converting data to standardized formats, and analyzing gathered data (including historical data) to more accurately assess risk associated with transactions.

VII. Example Interactive Graphical User Interfaces

FIG. 5A illustrates an example user interface 500 of the system, in which a form 501 is presented, prompting principal/user 400 to enter various information related to a project, for example, a home improvement project.

Figure 5B:
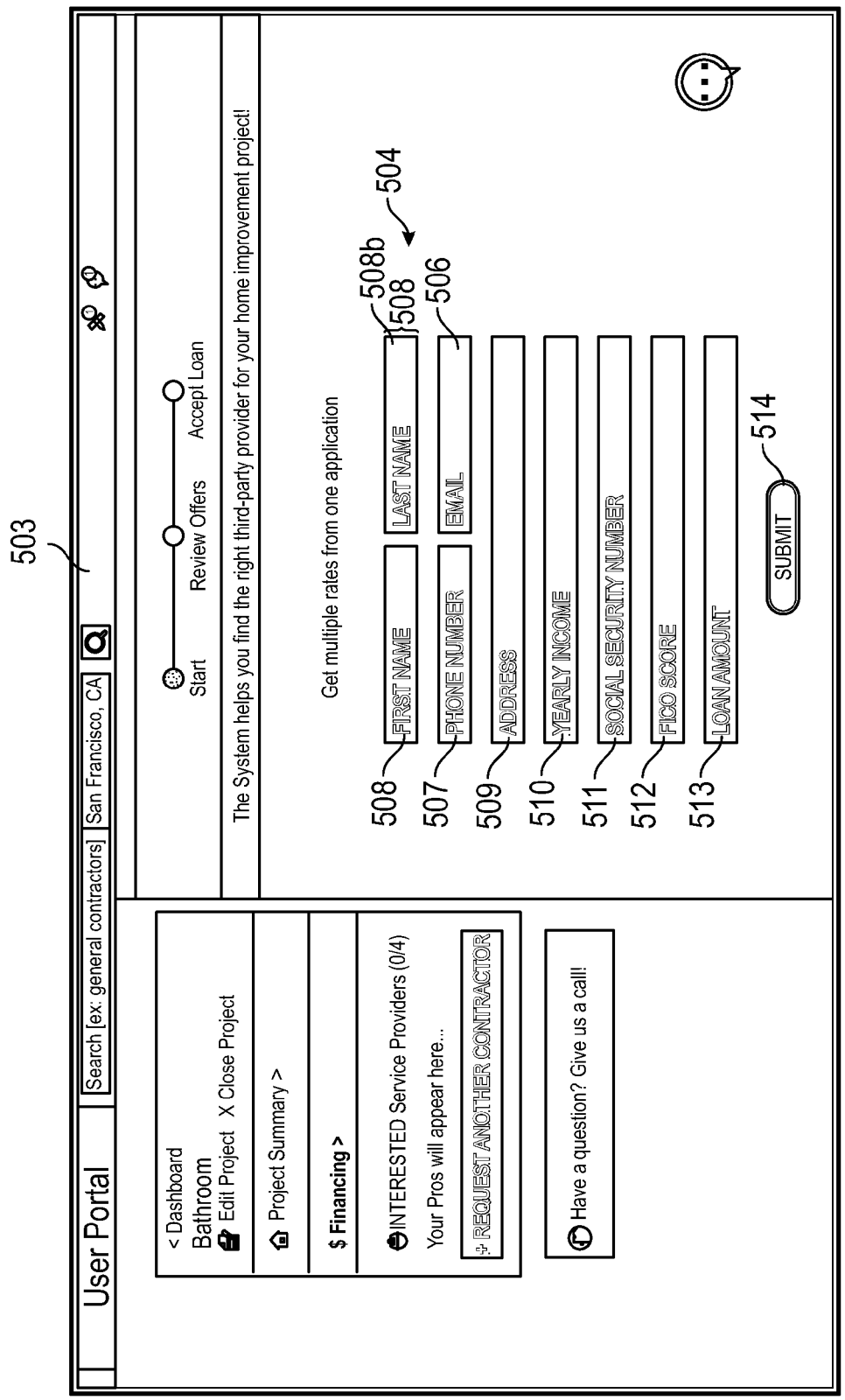
FIG. 5B illustrates an example user interface presenting an application to a user, according to an embodiment of the present disclosure.

FIG. 5B illustrates an example user interface 503 of the system, in which a form 504, prompting principal 400 to enter various information related to a financing application, is presented. Form 504 includes fields 508a, and 508b, prompting the user for his or her first and last name, respectively, field 507 prompting the user for his or her telephone number, field 506, prompting the user for his or her email address, field 509 prompting the user for his or her residential address, field 510, prompting the user for his or her annual income, field 511, prompting the user for his or her social security number, field 512, prompting the user to self-report his or her credit score, and field 513, prompting the user to enter a desired loan amount. Advantageously, allowing the user in field 512 to self-report his or her credit score may allow calculation of the user's interest rates without performing a credit inquiry at a credit bureau, and thus without adversely affecting the user's credit history. Selecting the submit button 514 allows the user to submit the information entered in form 504 to database system 102.

Figure 5C:
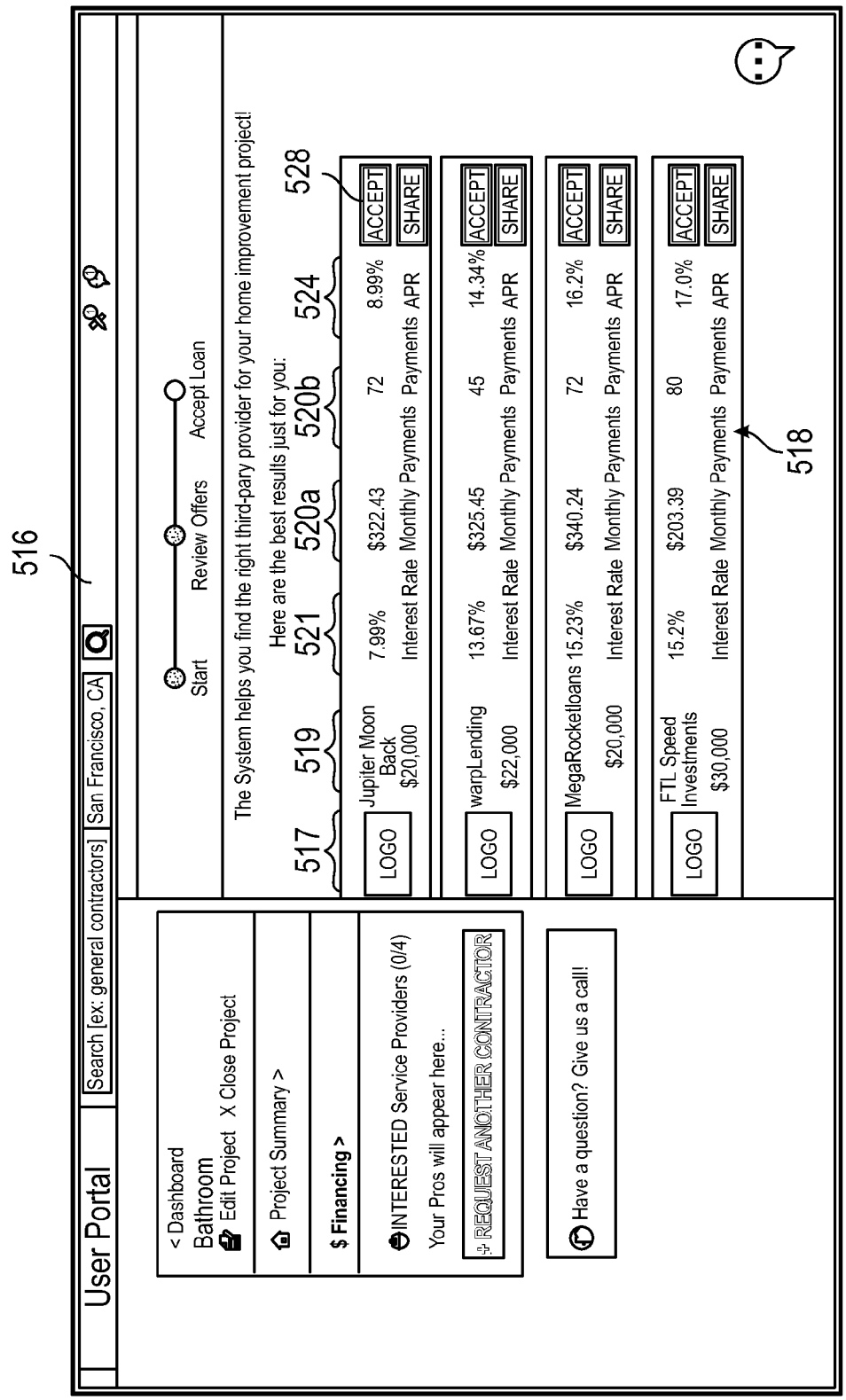
FIG. 5C illustrates an example user interface, presenting various options to a user, according to an embodiment of the present disclosure.

FIG. 5C illustrates an example user interface 516 of the system, in which various financing options are presented to a homeowner. User interface 516 comprises table 518, displaying information about different financing offers available to principal 400. Each financing offer is displayed in a row displaying multiple columns. Financing provider logo column 517 displays a logo or symbol representing the financing offer or provider. Financing amount column 519 displays the amount of financing available from the financing offer. Interest rate column 521 displays the interest rate charged by the financing provider. Monthly payments column 520a and number of payments column 520b display the dollar amount, or the number of payments, respectively, that the homeowner would be obligated to make under the terms of the financing offer. The annual percentage rate column 524 displays the annualized percentage rate corresponding to the financing offer, taking into account both the interest rate and the compounding periods under the terms of the offer. Accept button 528 allows the user to proceed to accepting the corresponding financing offer.

Figure 5D:
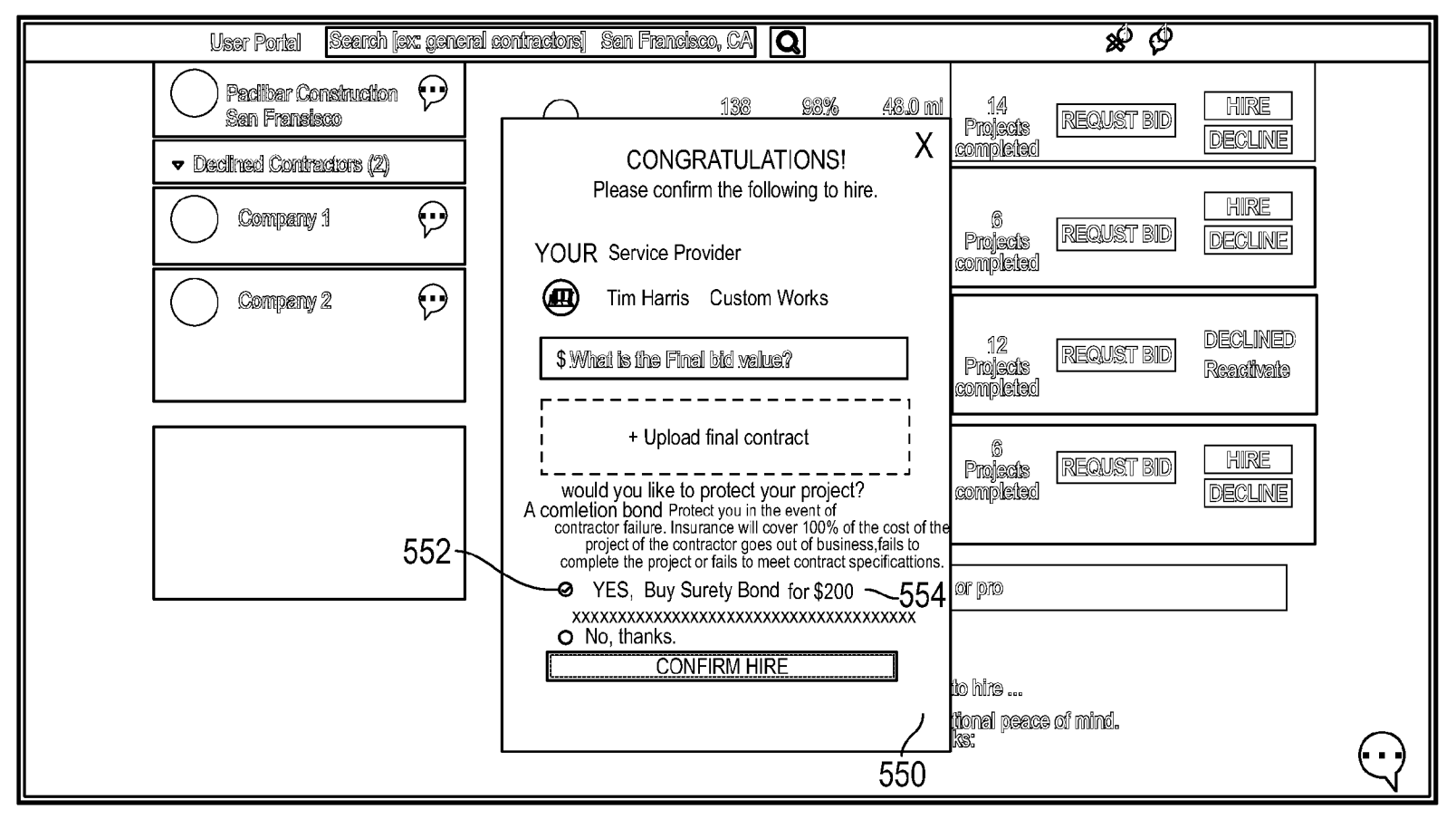

FIG. 5D illustrates an example user interface 550 of the system, in which a principal is requested to confirm hiring a specific contractor, and is offered to purchase a surety or completion bond. Option buttons 552 may allow the homeowner to select whether or not he or she wished to accept the offered surety/completion bond. Text field 554 indicates the cost of the completion bond to the homeowner. Advantageously, the price shown in text field 554 may be determined automatically as discussed. By selecting confirmation button 558, the homeowner may confirm hiring the contractor and/or purchasing the completion bond.

FIG. 6 illustrates an example user interface 600 of the system, in which a service provider, such as service provider 104, is presented with a form 604, requesting various information for a financing application. Form 604 may be similar to form 404, as previously discussed, and may additionally comprise fields related to the identity of the contractor's managing partners or other important individuals, fields related to the contractor's type of legal entity, and other contractor specific fields. The contractor is also presented with information box 608, indicating the specific job, including the volume, type, and location of the job site, related to which the contractor is applying for financing. Such information, as described above, may advantageously be gathered and used by the system in more accurately assessing risk.

FIG. 7 illustrates an example user interface 700 of the system, in which various financing options are presented to a service provider, such as service provider 104. Advantageously, the different financing options may be converted to, and displayed in, a common format that allows for simple comparison, despite the offers being quoted in different formats; for example, offers having their interest rate quoted based on different compounding periods may be normalized to an APR (annual percentage rate) to allow for a simple numeric comparison. The service provider is also presented with information box 704, indicating the specific job, including the volume, type, and location of the job site, related to which the financing offers apply.

FIG. 8 illustrates an example user interface 800 of the system, in which an insurance application for a specific job is presented to a service provider, such as service provider 104. User interface 800 may allow the contractor to apply for one or more different types of insurance related to its business, while minimizing the amount of redundant information to be entered by the service provider. Text box 848 describes the job for which the insurance application is being submitted. Insurance type section 804 allows the contractor to determine one or more types of insurance that it wishes to apply for. For example, by selecting box 808, the service provider may be permitted to apply for general liability insurance. By selection box 812 the service provider may apply for workers' compensation insurance. By selecting box 816, the service provider may apply for a business owners' insurance policy. Form 820 requests various types of financial information from the service provider. For example, form 820 may comprise a field 824, prompting the service provider to enter its annual revenue, a field 828, prompting the contractors to enter its annual gross receipts, field 832, prompting the contractor to enter a dollar total of its employee payroll, field 836, prompting the contractor to enter a dollar amount of subcontractor's payroll. Basic information section 840 displays various items of information from contractor database 201, and related databases. For example, basic information section 840 may display the name of the contractor's business, the type of legal entity under which the business is operated, various licensing numbers, contact information, and the year of foundation or incorporation. Additionally, basic information section 840 may display information about previous jobs, as may be known to the system from transaction database 210. The contractor may be permitted to click edit button 844 and thus make changes some of the information, for example if the contractor determines that the records held by the system are out of date or otherwise incorrect. Information box 848 indicates the specific job, including the volume, type and location of the job site, to which the current application for insurance is related to. By clicking submit button 850, the contractor can send off the insurance application, upon which the APIs of various insurance providers may be queried with the data entered by the contractor and/or other data accessible to the system.

Figure 9:
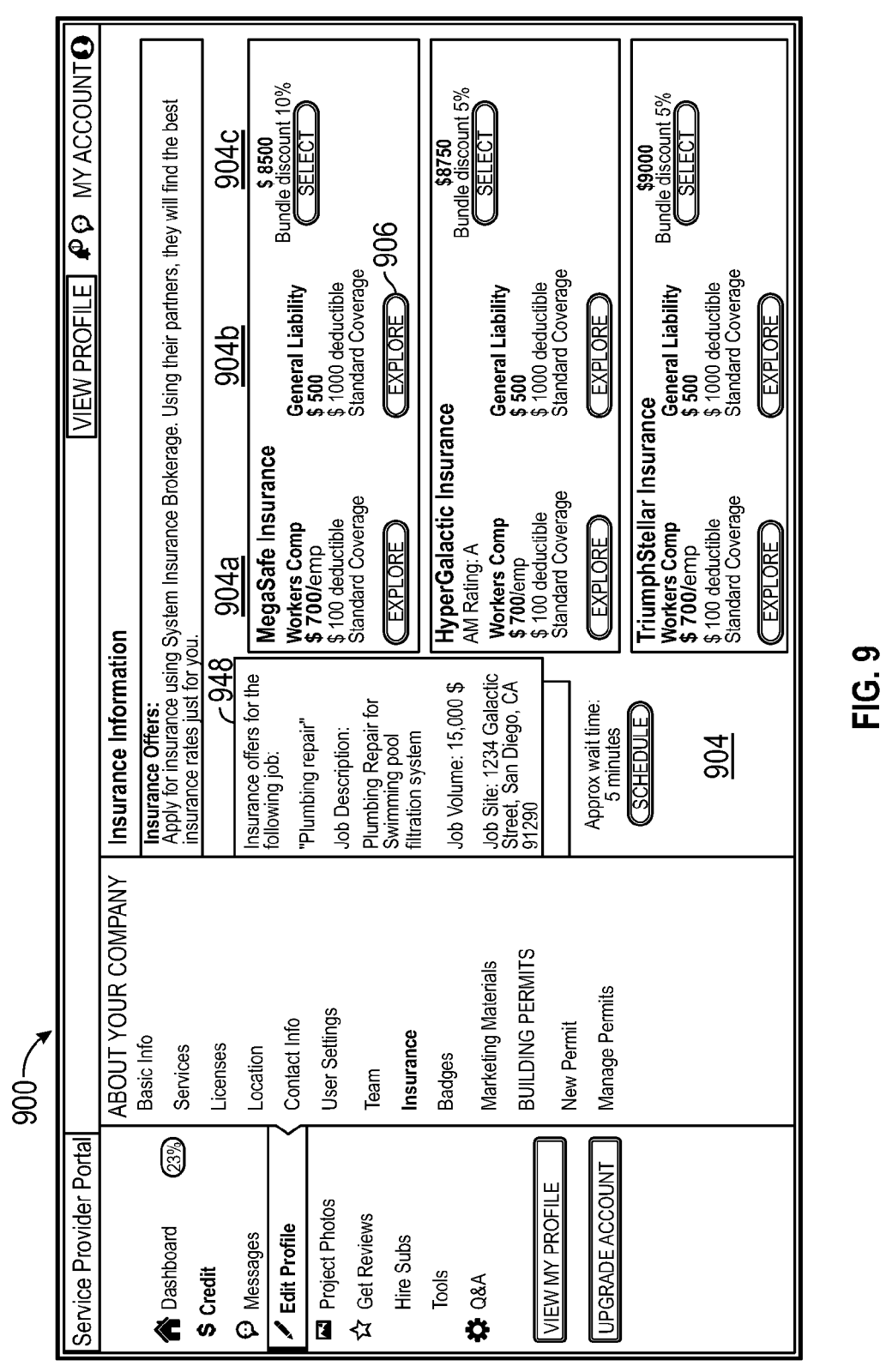

FIG. 9 illustrates a user interface 900 of the system, in which various insurance offers are presented to a service provider, such as service provider 104. Table 904 comprises different columns, corresponding to the types of insurance that the contractor has selected in section 804 in the previous user interface, as discussed with reference to FIG. 8. For example, table 904 may comprise workers' compensation insurance column 904a, a general liability insurance column 904b, and a bundle insurance column 904c. Each column contains the offers or the respective type of insurance that were received from an insurance provider; for example, as illustrated, three offers were received for workers' compensation insurance from three different insurance providers, and three offers were received for general liability insurance from those same insurance providers. Additionally, a discount or other incentive may be offered to the purchaser when purchasing more than one type of insurance from the same insurance provider; these bundled insurance offers are described in column 904C. Each insurance offer features a selectable button, such as button 906, that when selected, redirects the contractor to a page describing the terms, conditions, and other details regarding the insurance offer in more detail and allows the contractor to accept the offer. Information box 608 indicates the specific job, including the volume, type, and location of the job site, to which the displayed insurance offers relate to.

FIGS. 10A, 10B and 10C illustrate various example user interfaces as they may be displayed on a mobile device, for example on a mobile device carried by a service provider to a job site, such as service provider 220. In some embodiments, this may allow the contractor, for example on a job site, to present the homeowner with an opportunity to apply for, and enter into, third-party transactions, including financing, by using a mobile device.

FIG. 10A illustrates a mobile device 1000, displaying a mobile loan application user interface 1004. Comparable to form 404, loan application user interface 1004 may request various types of information from a homeowner which may be used to determine the homeowner's eligibility for financing. Additionally, because the mobile device user interface 1004 is displayed on a mobile device, a user may advantageously choose to, instead of manually entering the information, elect to scan a driver's license or identification document in order to automatically populate fields in form 1008. Scanning of the identification document may be performed by a camera included in the mobile device 1000, or using a magnetic stripe reader attached or included in mobile device 1000, for example. By selecting the next button 1012, the user may submit form 1008, thus causing the data in form 1008 to be submitted to various potential lenders through their APIs, as discussed previously.

FIG. 10B illustrates a mobile device 1000 displaying a financing options user interface 1044. User interface 1044 may include similar elements as were previously discussed with reference to user interface 500. When selecting one of the financing options shown in user interface 1044, the user may be directed to another page of a user interface showing additional detail about the selected financing option, as well as offering the user the opportunity to accept the offer and enter into a financing contract with the lender.

FIG. 10C illustrates a mobile device 1000 displaying a user interface 1084, displaying additional detail about a financing option selected by the user, and allowing the user to accept the terms of the financing offer by selecting the accept button 1064.

VIII. Additional Implementation Details and Embodiments

Various aspects of the database system (e.g., the database structure, the data processing and format conversions, various functionality of the modules, and/or the like) may individually and collectively provide various technical advantages as described herein. In some implementations the various aspects of the database system 102 may advantageously enable executing different aspects or modules of the system on different computing devices or processors, which may increase the scalability of the system. In some implementations the various aspects of the system may further advantageously enable sandboxing various aspects, data, or modules of the system from one another, which may increase security of the system by preventing, e.g., malicious intrusion into the system from spreading. In some implementations the various aspects of the system may further advantageously enable parallel execution of various aspects or modules of the system, which may increase the scalability of the system. In some implementations the various aspects of the system may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational blocks to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 11:
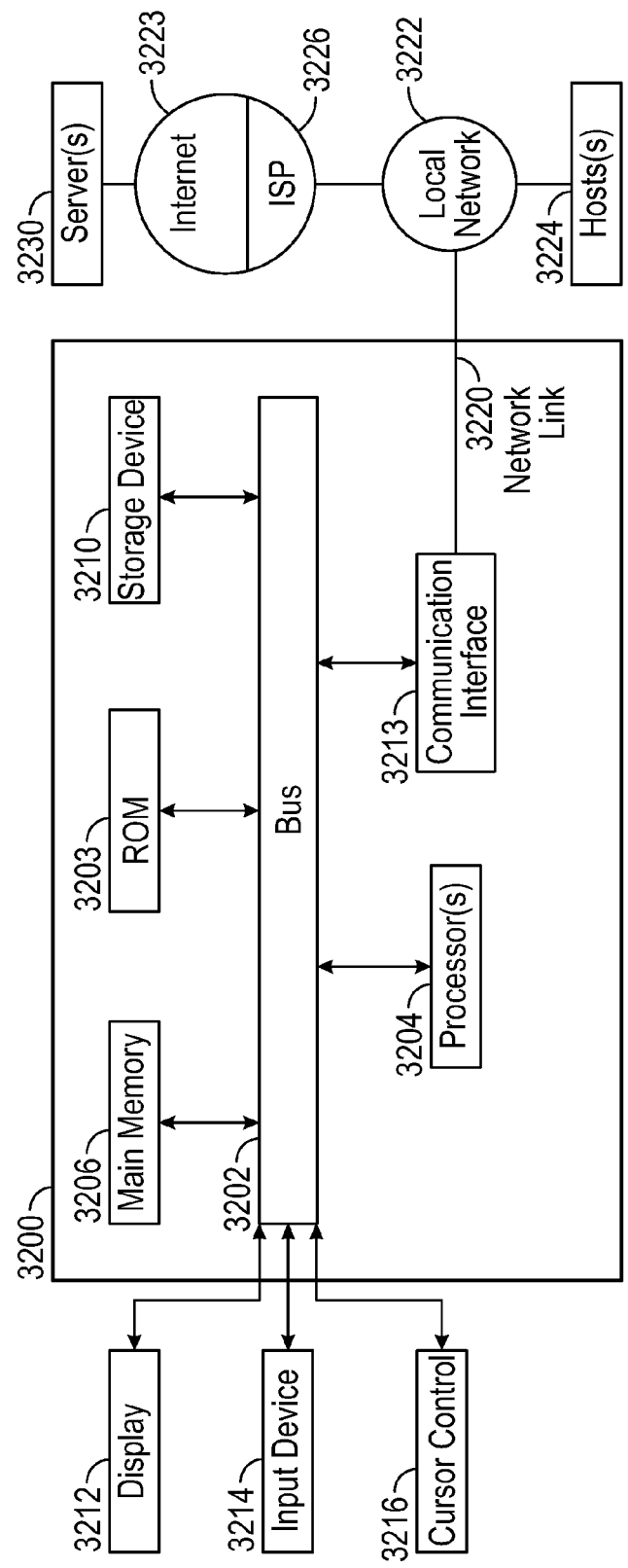
FIG. 11 illustrates a computer system with which certain aspects discussed herein may be implemented.

For example, FIG. 11 is a block diagram that illustrates a computer system 3200 upon which various embodiments may be implemented. For example, database system 102, described above in reference to FIG. 1, may be implemented as a computer system similar to computer system 3200. Computer system 3200 includes a bus 3202 or other communication mechanism for communicating information, and a hardware processor, or multiple processors, 3204 coupled with bus 3202 for processing information. Hardware processor(s) 3204 may be, for example, one or more general purpose microprocessors.

Computer system 3200 also includes a main memory 3206, such as a random access memory (RAM), cache and/or other dynamic storage devices, coupled to bus 3202 for storing information and instructions to be executed by processor 3204. Main memory 3206 also may be used for storing temporary variables or other intermediate information during execution of instructions to be executed by processor 3204. Such instructions, when stored in storage media accessible to processor 3204, render computer system 3200 into a special-purpose machine that is customized to perform the operations specified in the instructions.

Computer system 3200 further includes a read only memory (ROM) 32032 or other static storage device coupled to bus 3202 for storing static information and instructions for processor 3204. A storage device 3210, such as a magnetic disk, optical disk, or USB thumb drive (Flash drive), etc., is provided and coupled to bus 3202 for storing information and instructions.

Computer system 3200 may be coupled via bus 3202 to a display 3212, such as a cathode ray tube (CRT) or LCD display (or touch screen), for displaying information to a computer user. An input device 3214, including alphanumeric and other keys, is coupled to bus 3202 for communicating information and command selections to processor 3204. Another type of user input device is cursor control 3216, such as a mouse, a trackball, or cursor direction keys for communicating direction information and command selections to processor 3204 and for controlling cursor movement on display 3212. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 3200 may include a user interface module to implement a GUI that may be stored in a mass storage device as computer executable program instructions that are executed by the computing device(s). Computer system 3200 may further, as described below, implement the techniques described herein using customized hard-wired logic, one or more ASICs or FPGAs, firmware and/or program logic which in combination with the computer system causes or programs computer system 3200 to be a special-purpose machine. According to one embodiment, the techniques herein are performed by computer system 3200 in response to processor(s) 3204 executing one or more sequences of one or more computer readable program instructions contained in main memory 3206. Such instructions may be read into main memory 3206 from another storage medium, such as storage device 3210. Execution of the sequences of instructions contained in main memory 3206 causes processor(s) 3204 to perform the process blocks described herein. In alternative embodiments, hard-wired circuitry may be used in place of or in combination with software instructions.

Various forms of computer readable storage media may be involved in carrying one or more sequences of one or more computer readable program instructions to processor 3204 for execution. For example, the instructions may initially be carried on a magnetic disk or solid state drive of a remote computer. The remote computer can load the instructions into its dynamic memory and send the instructions over a telephone line using a modem. A modem local to computer system 3200 can receive the data on the telephone line and use an infra-red transmitter to convert the data to an infra-red signal. An infra-red detector can receive the data carried in the infra-red signal and appropriate circuitry can place the data on bus 3202. Bus 3202 carries the data to main memory 3206, from which processor 3204 retrieves and executes the instructions. The instructions received by main memory 3206 may optionally be stored on storage device 3210 either before or after execution by processor 3204.

Computer system 3200 also includes a communication interface 3213 coupled to bus 3202. Communication interface 3213 provides a two-way data communication coupling to a network link 3220 that is connected to a local network 3222. For example, communication interface 3213 may be an integrated services digital network (ISDN) card, cable modem, satellite modem, or a modem to provide a data communication connection to a corresponding type of telephone line. As another example, communication interface 3213 may be a local area network (LAN) card to provide a data communication connection to a compatible LAN (or WAN component to communicated with a WAN). Wireless links may also be implemented. In any such implementation, communication interface 3213 sends and receives electrical, electromagnetic or optical signals that carry digital data streams representing various types of information.

Network link 3220 typically provides data communication through one or more networks to other data devices. For example, network link 3220 may provide a connection through local network 3222 to a host computer 3224 or to data equipment operated by an Internet Service Provider (ISP) 3226. ISP 3226 in turn provides data communication services through the world wide packet data communication network now commonly referred to as the "Internet" 32232. Local network 3222 and Internet 3223 both use electrical, electromagnetic or optical signals that carry digital data streams. The signals through the various networks and the signals on network link 3220 and through communication interface 3213, which carry the digital data to and from computer system 3200, are example forms of transmission media.

Computer system 3200 can send messages and receive data, including program code, through the network(s), network link 3220 and communication interface 3213. In the Internet example, a server 3230 might transmit a requested code for an application program through Internet 3223, ISP 3226, local network 3222 and communication interface 3213.

The received code may be executed by processor 3204 as it is received, and/or stored in storage device 3210, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or blocks. Thus, such conditional language is not generally intended to imply that features, elements and/or blocks are in any way required for one or more embodiments or that one or more embodiments necessarily include logic for deciding, with or without user input or prompting, whether these features, elements and/or blocks are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A database system for accessing one or more databases, aggregating attributes from the one or more databases, and generating and providing application programming interface ("API") requests based on attributes, the database system comprising:
- one or more databases comprising a data structure comprising a plurality of data tables relationally linked by foreign keys, the data tables comprising:
- a user data table,
- a service provider data table,
- a third-party provider data table,
- a transaction data table, and
- a project data table, and
- a virtual computing environment comprising a plurality of software modules configured to interact with one another and with the one or more databases of the database system, wherein the virtual computing environment is in internet protocol communication with at least one external data source and computing devices of various entities, the various entities comprising:
- a first entity comprising a homeowner or user interesting in completing a project,
- a second entity comprising a contractor or service provider interested in performing services to the user to complete the project, and
- a plurality of third party providers comprising lenders and/or insurers interested in entering into a transaction with the user and the service provider to enable completion of the project,
- wherein the plurality of modules of the virtual computing environment are configured to interact with one another and with the one or more databases, the plurality of modules comprising:
- an interface module for providing a graphical user interface to computing devices of the user and the service provider;
- an API request data aggregation module for aggregating data from the one or more databases to prepare a plurality of API requests to the computing devices of the plurality of third-party service providers;
- an API request format generation module for converting each API request from among the plurality of API requests into a specific customized API format requested by each respective third-party provider, wherein data is received in a common format and converted into customized API requests;
- an API interaction module for communicating each specific customized API request to each respective computing device of the third-party providers and receiving API responses from respective computing devices of the third-party providers;
- an API response format standardization module for converting respective API responses into the common format; and
- an API response aggregation module for aggregating the API responses from the third-party providers and updating the one or more databases;
- wherein the project data table comprises unique identifiers for identifying a specific user and service provider associated with the project;
- wherein the data tables are maintained in a common format specific to the database system and not to the API format of the third party providers; and
- a computer readable storage medium having program instructions embodied therewith; and
- one or more processors configured to execute the program instructions to cause the database system to:
- identify, in the one or more databases, at least the user and the service provider associated with the project;
- access, from the one or more databases, a first set of attributes associated with the user, wherein the attributes comprise identification information and financial information associated with the user in the user data table;
- access, from the one or more databases, a second set of attributes associated with the service provider, wherein the attributes comprise at least identification information associated with the service provider in the service provider data table;
- access, from the one or more databases, a third set of attributes associated with the project, wherein the attributes comprise project information, user information, and service provider information associated with the project in the project data table;
- aggregate, using the API request data aggregation module, the first, second, and third sets of attributes into an aggregate set of attributes;
- determine, using the API request data aggregation module and based at least in part on the aggregate set of attributes, two or more third-party providers to which to send API requests;
- generate, using the API request format generation module, for each of the two or more third-party providers, respective customized API requests based on respective application programming interface formats associated with the two or more third-party providers;
- provide, using the API interaction module, the API requests to computing devices of the two or more third-party providers;
- receive, at the API interaction module, one or more API responses from at least some of the two or more third-party providers, wherein each of the AIP responses is associated with respective unique transaction identifiers; and
- in response to receiving, at the API interaction module, the one or more API responses from the at least some of the two or more third-party providers:
- analyze, using the API request data aggregation module and/or the API response format standardization module, the one or more API responses to determine whether the one or more API responses satisfy one or more criteria, wherein each API response comprises a proposed transaction for lending or insurance, each transaction being identified by the respective unique transaction identifiers;
- convert, using the API response format standardization module, each of the one or more API responses into respective standardized API responses based on the common format; and
- generate, using the user and service provider interaction module, user interface data configured for rendering a user interface, wherein the user interface includes indications of the one or more proposed transactions including one or more items of information from the associated standardized API responses.

2. The database system of claim 1, wherein the first entity and the second entity are associated with the project via database entries comprising identifiers associated with the respective first and second entities.

3. The database system of claim 2, wherein generating the respective customized API requests comprises:

identifying respective application programming interface format templates associated with each of the respective application programming interface formats; and based on the respective application programming interface format templates, determining respective modifications to the aggregate set of attributes to generate the respective customized API requests.

4. The database system of claim 3, wherein the respective modifications to the aggregate set of attributes include at least one of: combining attributes, reordering attributes, removing attributes, or reformatting attributes.

5. The database system of claim 4, wherein each of the respective customized API requests includes at least some attributes from the aggregate set of attributes.

6. The database system of claim 5, wherein each of the respective customized API requests includes at least some attributes associated with the first entity, at least some attributes associated with the second entity, and at least some attributes associated with the third entity.

7. The database system of claim 6, wherein the one or more criteria include at least one of: a threshold number of responses, a timeframe in which the responses are received, a quality of the responses.

8. The database system of claim 7, wherein converting each of the one or more responses into respective standardized responses includes at least one of: recalculating a value associated with a response, combining two or more data items associated with a response, reformatting a data item associated with a response, removing a data item associated with a response, or reordering two or more data items associated with a response.

9. The database system of claim 8, wherein the one or more processors are configured to execute the program instructions to further cause the database system to:

further in response to receiving one or more responses from at least some of the two or more third-party providers:

determine a prioritization of the one or more standardized responses, wherein the user interface includes the indications of the one or more standardized responses based on the prioritization.

10. The database system of claim 9, wherein the one or more processors are configured to execute the program instructions to further cause the database system to:

calculate, based at least in part on some of the aggregate set of attributes, a risk associated with at least one of the project or a transaction associated with the project.

11. The database system of claim 10, wherein the one or more processors are configured to execute the program instructions to further cause the database system to:

establish an account associated with at least one of the project or the transaction associated with the project; and recalculate, based at least in part on some of the aggregate set of attributes, and the establishment of the account, an updated risk associated with at least one of the project or a transaction associated with the project.

12. The database system of claim 11, wherein the aggregate set of attributes includes at least some historical information associated with at least one of the first, second, or third entities.

13. The database system of claim 12, wherein the one or more processors are configured to execute the program instructions to further cause the database system to:

further in response to receiving one or more responses from at least some of the two or more third-party providers:

provide the user interface data to a computing device configured to interactively render the user interface data and receive inputs from a user of the computing device.

14. A computer-implemented method comprising:

storing information related to one or more entities in a database system comprising a plurality of data tables relationally linked by foreign keys, wherein the data tables comprise:

a user data table, a service provider data table, a third-party provider data table, a transaction data table, and a project data table, and causing a plurality of software modules to interact, via a virtual computing environment, with one another and with the one or more tables of the database system, wherein the virtual computing environment is in internet protocol communication with at least one external data source and computing devices of various entities, wherein the various entities comprise:

a first entity comprising a homeowner or user interesting in completing a project, a second entity comprising a contractor or service provider interested in performing services to the user to complete the project, and a plurality of third party providers comprising lenders and/or insurers interested in entering into a transaction with the user and the service provider to enable completion of the project, wherein the plurality of software modules interact with one another and with the one or more tables of the database system to perform the steps of:

providing a graphical user interface to computing device of the user and the computing device of the service provider;

aggregating data from the one or more databases to prepare a plurality of API requests to the computing devices of the plurality of third-party service providers;

converting each API request from among the plurality of API requests into a specific customized API format requested by each respective third-party provider, wherein data is received in a common format and converted into customized API requests;

communicating each specific customized API request to each respective computing device of the third-party providers and receiving API responses from respective computing devices of the third-party providers;

converting respective API responses into the common format; and aggregating the API responses from the third-party providers and updating the one or more databases;

wherein the project data table comprises unique identifiers for identifying a specific user and service provider associated with the project;

wherein the data tables are maintained in a common format specific to the database system and not to the API format of the third party providers; and wherein the computing devices comprise one or more processors configured to execute program instructions to cause the database system to perform the steps of:

identifying, in one or more databases, at least a first entity and a second entity associated with a project;

accessing, from the one or more databases, a first set of attributes associated with the first entity;

accessing, from the one or more databases, a second set of attributes associated with the second entity;

accessing, from the one or more databases, a third set of attributes associated with the project;

aggregating the first, second, and third sets of attributes into an aggregate set of attributes;

determining, based at least in part on the aggregate set of attributes, two or more third-party providers to which to send API requests;

generating, for each of the two or more third-party providers, respective customized API requests based on respective application programming interface formats associated with the two or more third-party providers;

providing the API requests to the two or more third-party providers; and in response to receiving one or more API responses from at least some of the two or more third-party providers:

analyzing the one or more API responses to determine whether the one or more API responses satisfy one or more criteria, wherein each API response comprises one or more proposed transactions for lending or insurance, each transaction being identified by the respective unique transaction identifiers;

converting each of the one or more API responses into respective standardized API responses based on a common format; and generating a user interface rendering on the computing device of the user the one or more proposed transactions including one or more items of information from the one or more standardized API responses.

* * * * *